(12) United States Patent
Crowe et al.

(10) Patent No.: US 7,251,589 B1
(45) Date of Patent: Jul. 31, 2007

(54) COMPUTER-IMPLEMENTED SYSTEM AND METHOD FOR GENERATING FORECASTS

(75) Inventors: Keith E. Crowe, Cary, NC (US); Rajesh S. Selukar, Cary, NC (US); Michael J. Leonard, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 11/431,089

(22) Filed: May 9, 2006

Related U.S. Application Data

(60) Provisional application No. 60/679,093, filed on May 9, 2005.

(51) Int. Cl.
*G06F 15/00* (2006.01)
*G06F 17/18* (2006.01)

(52) U.S. Cl. ........................ 702/189; 702/181
(58) Field of Classification Search ........ 702/179–181, 702/189; 705/10
See application file for complete search history.

(56) References Cited

U.S. PATENT DOCUMENTS

| | | | |
|---|---|---|---|
| 6,564,190 B1 * | 5/2003 | Dubner .................... | 705/36 R |
| 6,928,398 B1 | 8/2005 | Fang et al. ................ | 703/2 |
| 7,171,340 B2 | 1/2007 | Brocklebank ............. | 702/189 |
| 2003/0187719 A1 * | 10/2003 | Brocklebank ............. | 705/10 |
| 2003/0200134 A1 | 10/2003 | Leonard et al. ........... | 705/10 |

OTHER PUBLICATIONS

U.S. Appl. No. 11/431,127, Jackson et al., filed May 9, 2006, "Computer-Implemented Systems and Methods for Defining Events".*

U.S. Appl. No. 11/431,116, Park et al., filed May 9, 2006, "Computer-Implemented Systems and Methods for Processing Time Series Data".*

U.S. Appl. No. 11/431,123, Crowe et al., filed May 9, 2006, "Computer-Implemented Systems and Methods for Processing Storing Data Analysis Models".*

Leonard, Michael, "Promotional Analysis and Forecasting for Demand Planning: A Practical Time Series Approach", with exhibits 1 and 2, SAS Institute Inc., Cary, North Carolina, 2000, 50 pp.

Leonard, Michael, "Large-Scale Automatic Forecasting Using Inputs and Calendar Events", abstract and presentation, International Symposium on Forecasting Conference, Jul. 4-7, 2004, 56 pp.

(Continued)

*Primary Examiner*—Michael Nghiem
(74) *Attorney, Agent, or Firm*—Jones Day

(57) ABSTRACT

Computer-implemented systems and methods for performing forecast scoring based upon time series data that is indicative of a data generation activity occurring over a period of time. One or more data stores store historical data and future data. The historical data includes historical exogenous inputs. The future data includes future exogenous inputs. A dynamic statistical model receives the historical data and future data that are stored in the one or more data stores. The dynamic statistical model is to provide forecast scoring based upon the historical exogenous inputs and the future exogenous inputs. An optimizer having an objective function iteratively varies the future data, so that forecasts associated with the varying future data values are generated by the dynamic statistical model for evaluation by the objective function.

20 Claims, 19 Drawing Sheets

OTHER PUBLICATIONS

Leonard, Michael et al., "Mining Transactional and Time Series Data", abstract and presentation, International Symposium of Forecasting, 2003, 23 pp.

Leonard, Michael, "Large-Scale Automatic Forecasting: Millions of Forecasts", abstract and presentation, International Symposium of Forecasting, 2002, 156 pp.

"Data Mining Group", http://www.dmg.org, printed May 9, 2005, 3 pp.

Jackson, Wilma S. et al., U.S. Appl. No. 11/431,127, filed May 9, 2006 entitled "Computer-Implemented Systems And Methods For Defining Events".

Park, Youngjin et al., U.S. Appl. No. 11/431,116, filed May 9, 2006 entitled "Computer-Implemented Systems And Methods For Processing Time Series Data".

Crowe, Keith E. et al., U.S. Appl. No. 11/431,123, filed May 9, 2006 entitled "Computer-Implemented Systems And Methods For Storing Data Analysis Models".

Leonard, Michael et al., "Mining Transactional and Time Series Data", abstract, presentation and paper, SUGI, Apr. 10-13, 2005, 142 pp.

Leonard, Michael, "Predictive Modeling Markup Language for Time Series Models", abstract and presentation, International Symposium on Forecasting Conference, Jul. 4-7, 2004, 35 pp.

Leonard, Michael, "Large-Scale Automatic Forecasting Using Inputs and Calendar Events", White Paper, 2005, pp. 1-27.

* cited by examiner

```
proc hpfarimaspec modelrepository=work.repo specname=ar;
   dependent symbol=Y q=1 dif=12;
   input predefined=LINEAR;
   input symbol=controlinput;
   input predefined=INVERSE;
run;

proc hpfselect modelrepository=work.repo selectname=select;
   spec ar;
run;

proc catalog catalog=work.scores kill; run;

* generate score;
proc hpfengine data=air modelrepository=work.repo out=engineout
      globalselection=select scorerepository=work.scores;
   id date interval=month;
   forecast air;
   controllable controlinput/extend=avg;
   score;
run;

filename score catalog "work.scores.scor0.xml";
```

```
proc means data=airmean noprint;
    var controlinput;
    output out=controlmean mean=mean;
run;

data _null_;
    set controlmean;
    call symput ("mean", mean);
run;

data forecasts;
    drop p1 p2 p3;
    format date monyy.;
    date='01jan1961'd;
    call HPFSCSUB;('SCORE',3,'CONTROLINPUT',&mean, &mean, &mean, &mean,
                   'PREDICT', p1, p2, p3);

forecast=p1; date=intnx ('month', date, 0); output;
    forecast=p2; date=intnx ('month', date, 1); output;
    forecast=p3; date=intnx ('month', date, 1); output;
run;

data compare;
    merge engineout forecasts;
    by date;
run;

proc print data=compare (where=(forecast ne .)) noobs;
run;
```

Fig. 18

| DATE | AIR | forecast |
|------|---------|----------|
| JAN1961 | 416.408 | 416.408 |
| FEB1961 | 391.715 | 391.715 |
| MAR1961 | 419.312 | 419.312 |

COMPUTER-IMPLEMENTED SYSTEM AND METHOD FOR GENERATING FORECASTS

CROSS-REFERENCE TO RELATED APPLICATIONS

This application is related to and claims the benefit of and priority to U.S. Provisional Patent Application No. 60/679,093 filed May 9, 2005 entitled "Computer-Implemented Forecasting Systems And Methods," the entire document (e.g., specification, drawings, etc.) of which is herein expressly incorporated by reference and hereinafter referred to herein as the "Forecasting Provisional Application." This application is related to U.S. patent application Ser. No. 11/431,127 (filed May 9, 2006 entitled "Computer-Implemented Systems And Methods For Defining Events"), U.S. patent application Ser. No. 11/431,116 (filed May 9, 2006 entitled "Computer-Implemented Systems And Methods For Processing Time Series Data"), and U.S. patent application Ser. No. 11/431,123 (filed May 9, 2006 entitled "Computer-Implemented Systems And Methods For Storing Data Analysis Models").

TECHNICAL FIELD

This document relates generally to computer-implemented statistical analysis techniques and more particularly to generating forecasts.

BACKGROUND

Time series data are time-stamped data collected over time. Some examples of time series data are
  web visits per hour
  sales per month
  inventory draws per week
  calls per day
  trades per weekday
  etc.

As can be seen, the frequency associated with the time series varies with the problem at hand. The frequency or time interval may be hourly, daily, weekly, monthly, quarterly, yearly, or many other variants of the basic time intervals.

Associated with a time series could be a seasonal cycle (seasonality) or a business cycle. For example, the length of seasonality for a monthly time series is usually assumed to be twelve because there are twelve months in a year. Likewise, the seasonality of a daily time series is usually assumed to be seven. The usual seasonality assumption may not always hold. For example, if a particular business' seasonal cycle is fourteen days long, the seasonality is fourteen, not seven. Seasonality considerations constitutes just some of the difficulties confronting analysis of a time series. The difficulties significantly grow if many time series have to be analyzed.

SUMMARY

In accordance with the teachings provided herein, systems and methods for operation upon data processing devices are provided regarding the generation of forecasts. For example, a computer-implemented system and method can be configured to perform forecast scoring based upon time series data that is indicative of a data generation activity occurring over a period of time. One or more data stores can store historical data and future data. The historical data includes demand series and historical exogenous inputs. The future data includes future exogenous inputs. A dynamic statistical model receives the historical data and future data that are stored in the one or more data stores. The dynamic statistical model provides forecast scoring based upon the historical data and the future exogenous inputs. An optimizer having an objective function iteratively varies the future data, so that forecasts associated with the varying future data values are generated by the dynamic statistical model for evaluation by the objective function.

BRIEF DESCRIPTION OF THE FIGURES

FIGS. 17–19 depict examples of operation of software routine in a decision process.

DETAILED DESCRIPTION

Figure 1:
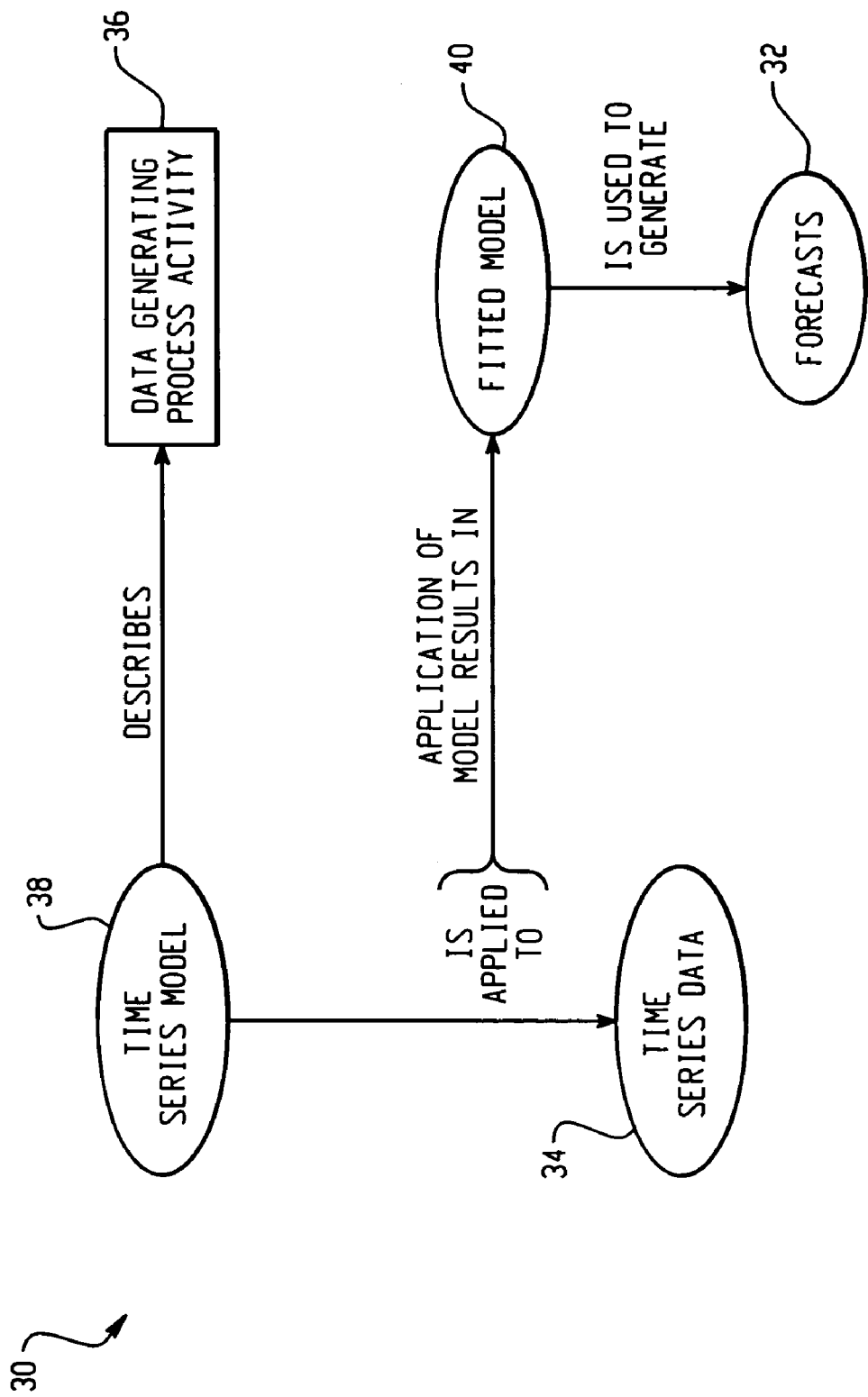
FIGS. 1–3 are block diagrams depicting computer-implemented systems to generate forecasts.

FIG. 1 depicts a computer-implemented system 30 to generate forecasts 32. As part of the process in generating forecasts 32, time series data 34 is received that was generated from a data generating process activity 36. The activity 36 could be any type of process that can be measured over time, such as sales data for a company over a period of a year.

A time series model 38 is applied to the time series data 34 in order to generate a fitted model 40. A time series model 38 describes the data generating process 36. Assuming that a particular data generating process 36 produced a time series 34, a time series model 38 can be selected that approximates this data generating process 36. Applying the statistical features associated with this model 38 generates forecasts 32 for future time series values. A time series model 38 is not dependent on any specific time series data.

A fitted model 40 results from applying a time series model 38 to specific time series data (e.g., data 34). Given a time series 34 and a time series model 38, model parameter estimates can be optimized to fit the time series data. The fitted model 40 is used to forecast the time series 34.

Figure 2:
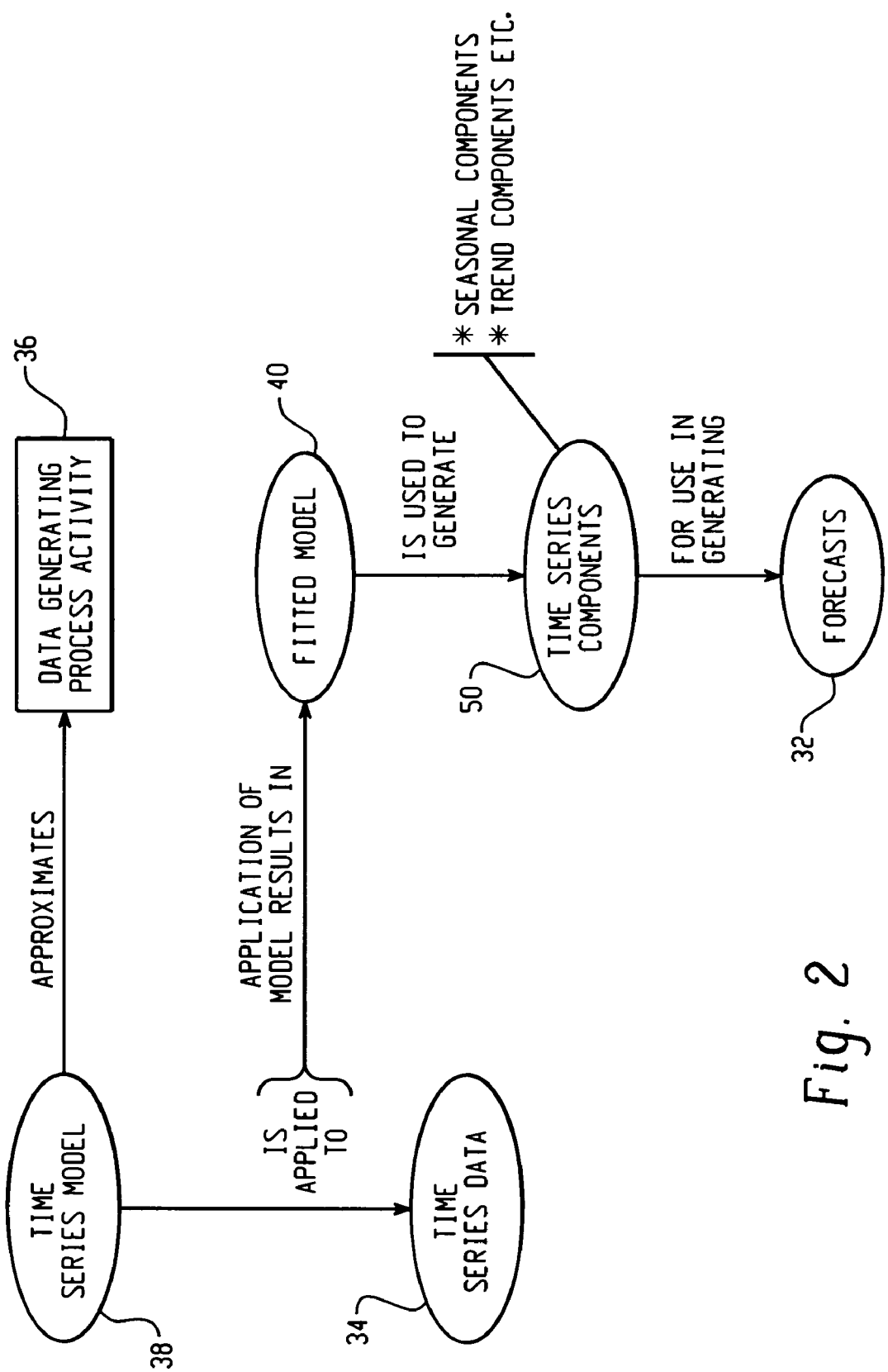

A way in which a fitted model 40 helps in the generation of forecasts 32 is illustrated in FIG. 2. A fitted model 40 can be used to generate time series components 50 such as seasonal components, trend components, etc. These components 50 help explain the time series data 34 from different vantage points, such as to help explain seasonality aspects and/or trend aspects that might be present in the time series data 34. Such explanations improve the forecasting capability.

Figure 3:
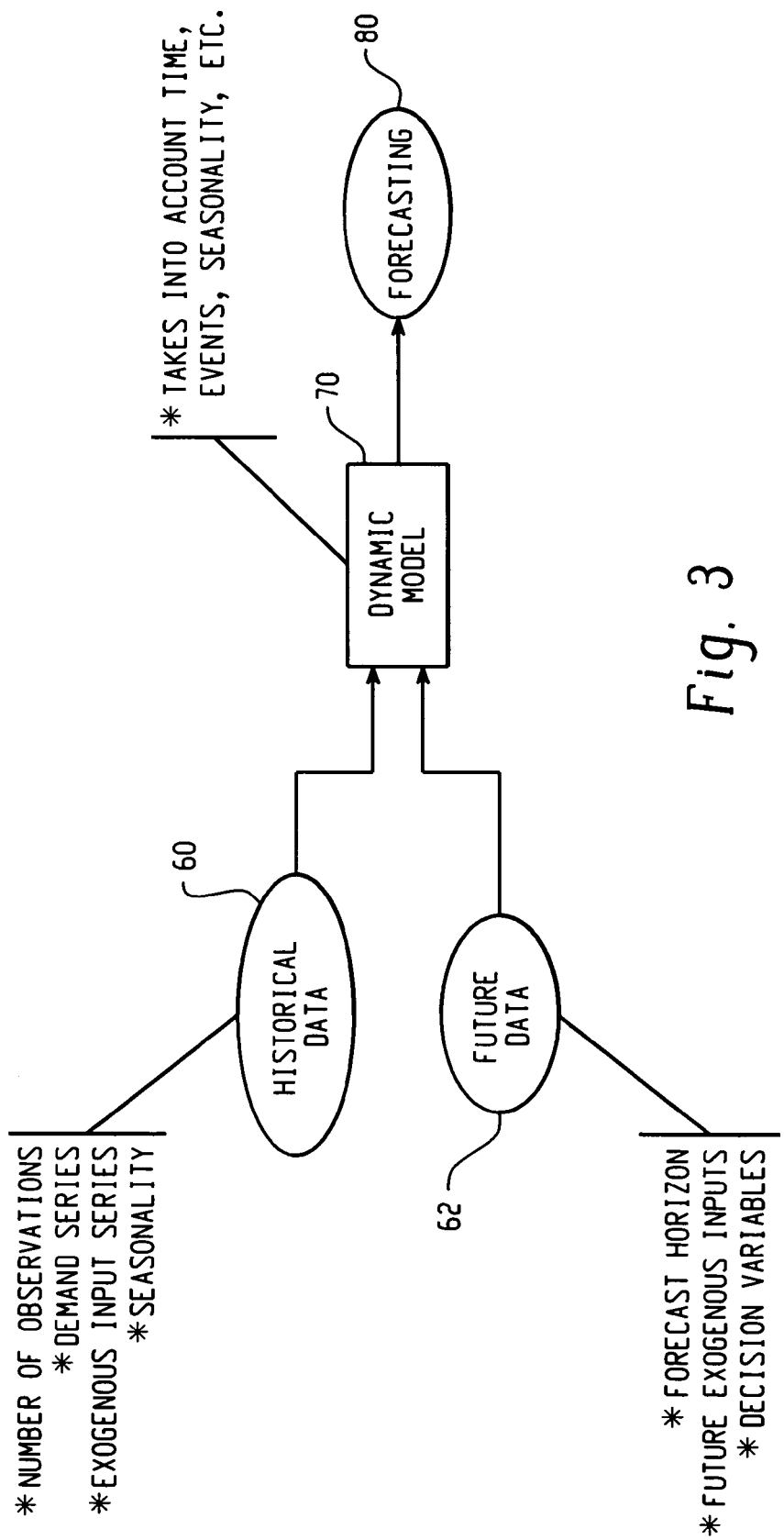

As illustrated in FIG. 3, by incorporation of such time series components (shown in FIG. 2), a dynamic model 70 can be constructed that can take into account time and seasonality aspects as well as take into account whether one or more events may have an impact upon a data generation process activity.

A dynamic model 70 receives historical data 60 and future data 62 in order to perform forecasting 80. Examples of historical data 60 include the number of observations in a time series, demand series information, exogenous input series data, and historical seasonality data. Examples of future data 62 include a forecast horizon (e.g., number of time periods into the future which are forecasted; forecasts for next year are said to have a one-year forecast horizon), future exogenous inputs, and decision variables.

To illustrate features of a dynamic model 70, it is noted that a time series can be modeled statically, dynamically, or both. A static model does not take time or season into account; a static model does not take cross (auto) correlation with respect to (seasonal) time lags into account. For example in a static model, an optimal price change does not take into account the past or future price changes nor the effect of the change of seasons (January, February, etc.). A dynamic model 70 does take time or season into account. For example, if a dynamic model 70 is configured to provide forecasts about a pricing for a company's product, the optimal price change takes into account the past or future price changes and the effect of the change of seasons.

Figure 4:
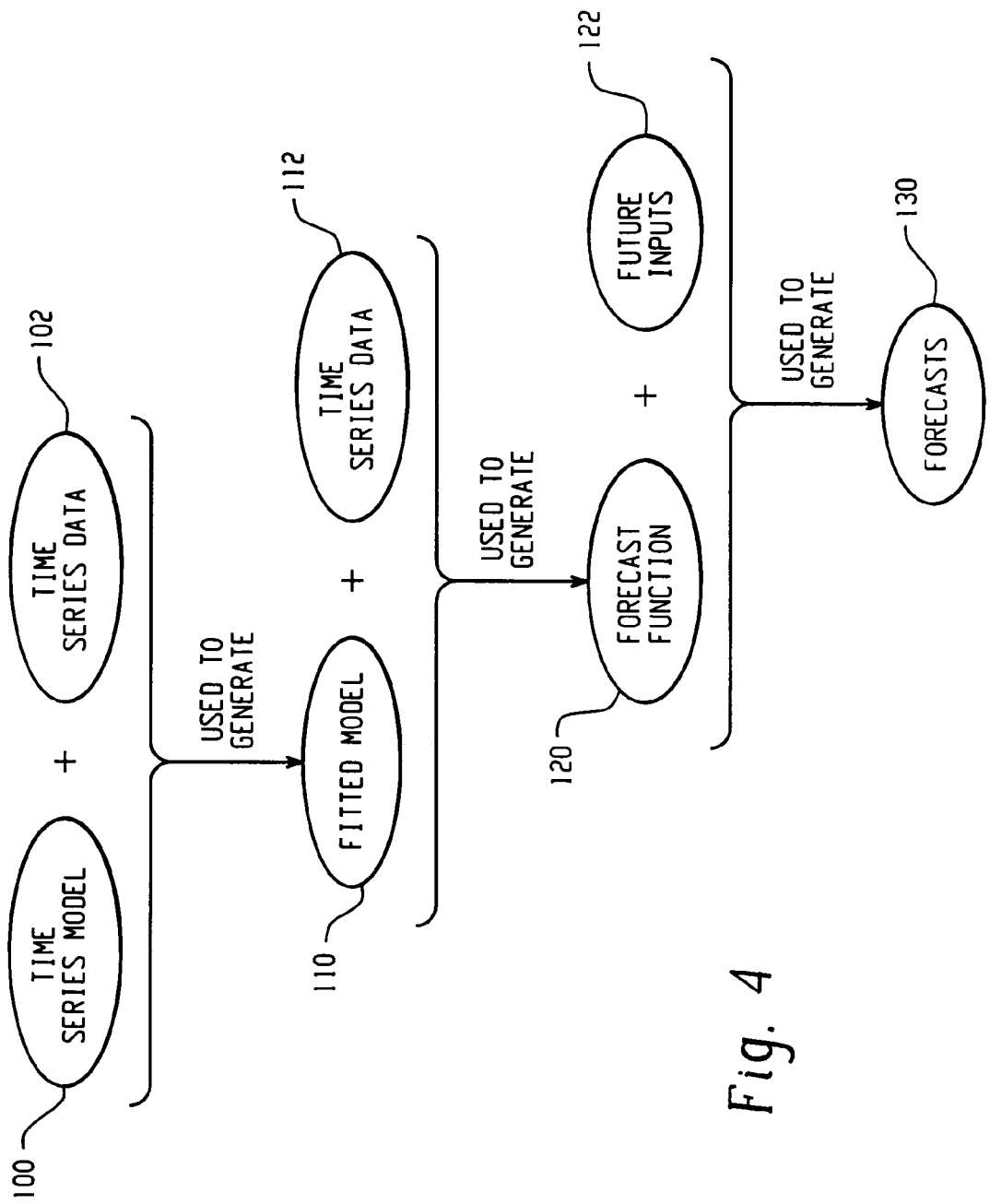
FIGS. 4–6 depict different models that can be generated as part of a process to provide forecasts.

FIG. 4 illustrates the different models that can be generated as part of a process to provide forecasts 130. To generate forecasts 130 such as for use by a decision-making process, an appropriate time series model 100 is selected to model a data generating process. The selected model 100 can be specified by time series analysts or by automatic forecasting software or a combination of both. A selected model 100 can have a model specification that specifies a single time series model to be used for forecasting and can be expressed as follows:

$$y_t = F(Y_{t-1}, X_t; \theta) + \epsilon_t$$

As an example, a general ARIMAX model specification could be as follows:

$$D(B)D_s(B^s)f(y_t) =$$

$$\mu + \sum_{i=1}^{N} B^{k_i} D_i(B) D_{s,i}(B^s) \frac{\omega_i(B)\omega_{s,i}(B^s)}{\delta_i(B)\delta_{s,i}(B^s)} f_i(x_{i,t}) + \frac{\theta(B)\theta_s(B^s)}{\phi(B)\phi_s(B^s)} \varepsilon_t$$

Using the historical time series data 102 and the selected model specification 100, a fitted model 110 can be created using model parameter estimation or model fitting process. A fitted model 110 can be expressed as follows:

$$y_t = F(Y_{t-1}, X_t; \hat{\theta}) + \hat{\epsilon}_t$$

Given a fitted model 110 and a time series 112, a forecast function 120 can be generated that encapsulates the information needed to forecast the series 112 when future inputs 122 (e.g., of causal factors) are provided. A forecast function 120 is a formula and can be used for decision-making processes such as scenario analysis, goal seeking, and stochastic optimization. A forecast score specifies how to forecast a single time series given a fitted model with varying future input values. The forecast function 120 can be expressed as follows:

$$y_t = \hat{F}(X_t)$$

As mentioned above, the inputs to the forecast function 120 are future causal factor values 122. The outputs of the forecast function are the forecasts 130 based on these future causal factor values 122. Varying future causal factor values 122 to the forecast functions varies the resultant forecasts 130. Iteratively varying future causal factor values 122 can be used in decision-making processes.

For example, organizations may wish to make decisions based on time series forecasts that depend on future controllable causal factors. An example of future causal factors are pricing and advertising expenditures for products and services. Organizations want to make decisions that benefit themselves. To help organizations make better decisions, the future values of the controllable causal factors can be varied to help determine the best decision. The future values of the causal factors can be varied for scenario analysis (what-if analysis), optimization, or goal seeking to aid proper decision-making.

A skilled analyst can model a single time series by applying good judgment based on his or her knowledge and experience, by using various time series analysis techniques, and by utilizing good software based on proven statistical theory. Selecting models for large numbers of time series requires at least some degree of automation.

Figure 5:
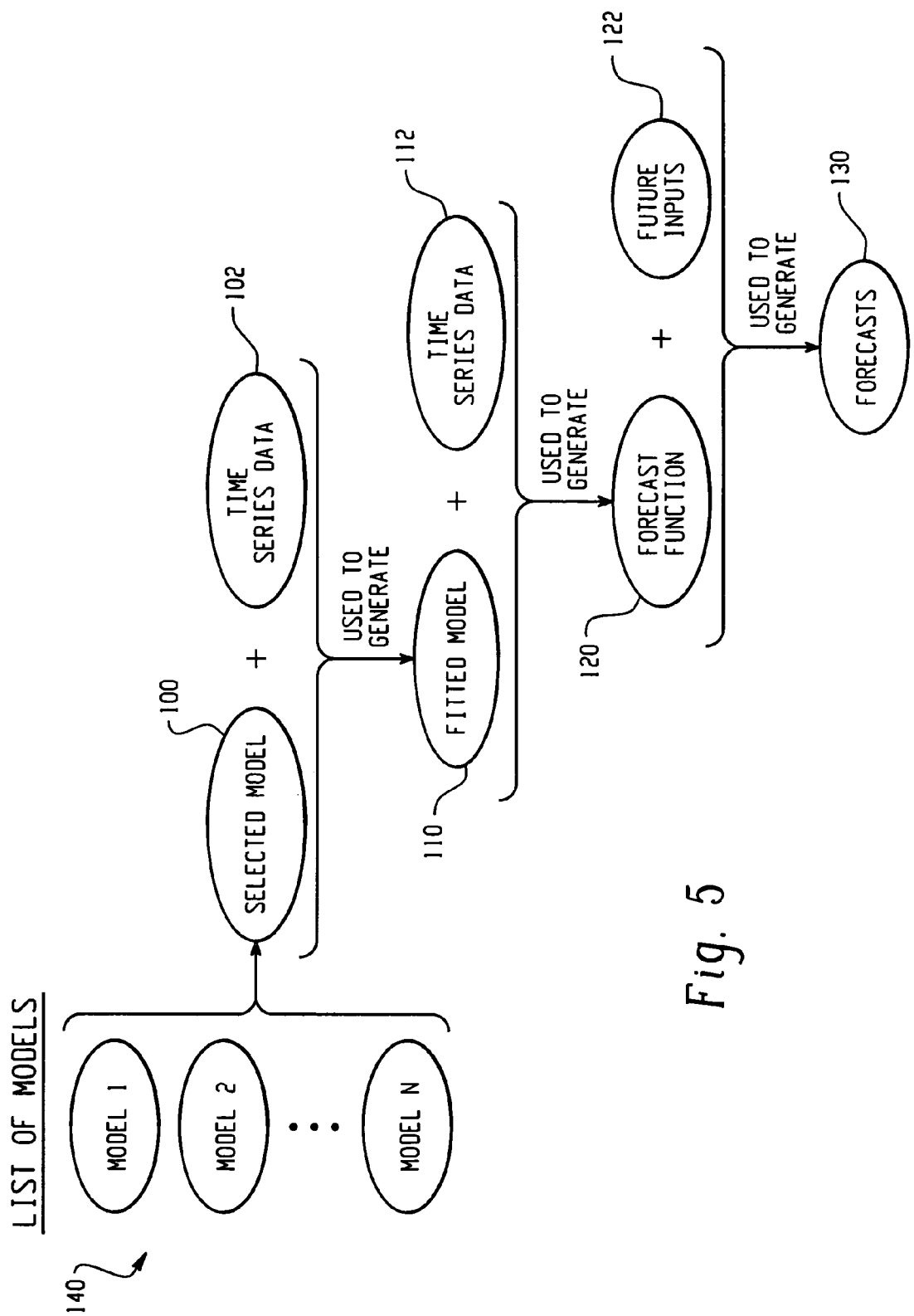

With reference to FIG. 5, a model 100 can be selected from a plurality of different models 140. Each of the different models 140 can be models from different families of models, (e.g., ARIMA, UCM, ESM, and other families of models). A model selection list 140 can be used to specify a list of candidate model specifications and how to choose which model specification is best suited to forecast a particular time series. Different techniques can be utilized in determining how to select a model. As an illustration, the model selection techniques discussed in the Forecasting Provisional Application can be used.

Models in the list 140 can be associated with components that are not only useful for forecasting but also for describing how the time series evolves over time. The forecasting model decomposes the series into its various components. For example, the local trend component describes the trend (up or down) at each point in time, and the final trend component describes the expected future trend. These forecasting models can also indicate departures from previous behavior or can be used to cluster time series.

The parameter estimates (weights or component variances) describe how fast the component is changing with time. Weights or component variances near zero indicate a relative constant component; weights near one or large component variances indicate a relatively variable component. For example, a seasonal weight near zero or a component variance near zero represents a stable seasonal component; a seasonal weight near one or a large component variance represents an unstable seasonal component. Parameter estimates should be optimized for each time series for best results.

Examples of models include: local level models, local trend models, local seasonal models, local models, ARIMA models, causal models, transformed models, intermittent demand models, external and user-defined models, etc.

The local level models are used to forecast time series whose level (or mean) component varies with time. These models predict the local level for future periods.

(Series)=(Local Level)+(Error)

Examples of local level models are Simple Exponential Smoothing and Local Level Unobserved Component Model. This model has one parameter (level), which describes how the local level evolves. The forecasts for the future periods are simply the final local level (a constant).

Local trend models are used to forecast time series whose level or trend/slope components vary with time. These models predict the local level and trend for future periods.

(Series)=(Local Level)+(Local Trend)+(Error)

Examples of local trend models are Double (Brown), Linear (Holt), Damped-Trend Exponential Smoothing, and Local Trend Unobserved Component Model. The double model has one parameter (level/trend weight), the linear model has two parameters (level and trend), and the damped-trend model has three parameters (level, trend, and damping weights). The damping weight dampens the trend over time. The forecasts for the future periods are a combination of the final local level and the final local trend.

Local seasonal models are used to forecast time series whose level or seasonal components vary with time. These models predict the local level and season for future periods.

(Series)=(Local Level)+(Local Season)+(Error)

Examples of local seasonal models are Seasonal Exponential Smoothing and the Local Seasonal Unobserved Component Model. The seasonal model has two parameters (level and seasonal). The forecasts for the future periods are a combination of the final local level and the final local season.

The local models are used to forecast time series whose level, trend, or seasonal components vary with time. These models predict the local level, trend, and seasonal component for future periods.

(Series)=(Local Level)+(Local Trend)+(Local Season)+(Error)

(Series)=((Local Level)+(Local Trend))×(Local Season)+(Error)

Examples of local models are the Winters Method (additive or multiplicative) and the Basic Structural Model. These models have three parameters (level, trend, and seasonal). The forecasts for the future periods are a combination of the final local level, the final local trend, and final local season.

The Autoregressive Integrated Moving Average Models (ARIMA) are used to forecast time series whose level, trend, or seasonal properties vary with time. These models predict the future values of the time series by applying non-seasonal or seasonal polynomial filters to the disturbances. Using different types of polynomial filters permits the modeling of various properties of the time series.

(Series)=DisturbanceFilter(Error)

Examples of ARIMA models are the Exponentially Weighted Moving Average (EWMA), moving average processes (MA), integrated moving average processes (IMA), autoregressive processes (AR), integrated autoregressive processes (IAR), and autoregressive moving average processes (ARMA).

Causal time series models are used to forecast time series data that are influenced by causal factors. Input variables (regressor or predictor variables) and calendar events (indicator, dummy, or intervention variables) are examples of causal factors. These independent (exogenous) time series causally influence the dependent (response, endogenous) time series and, therefore, can aid the forecasting of the dependent time series.

Examples of causal time series models are Autoregressive Integrated Moving Average with exogenous inputs (ARIMAX), which are also known as transfer function models or dynamic regression models, and Unobserved Component Models (UCM), which are also known as state-space models and structural time series models.

(Series)=TransferFunctionFilter(Causal Factors)+DisturbanceFilter(Error)

(Series)=(Local Level)+(Local Trend)+(Local Season)+(Causal Factors)+(Error)

These regression models are dynamic in that they take into account the autocorrelation between observations recorded at different times. Dynamic regression includes and extends multiple linear regression (static regression).

Input variables can be continuous-valued time series. They represent causal factors that influence the dependent time series throughout the time range. Examples of input variables are prices, temperatures, and other economic or natural factors. Input variables are contained in the time series data set.

Calendar events can be represented by indicator variables that are typically discrete-valued. They indicate when the causal factor influences the dependent time series. Typically, zero values indicate the absence of the event and nonzero values indicate the presence of the event. These dummy regressors can consist of pulses (points), steps (shifts), ramps, and temporary changes and combinations of these primitive shapes. The values of the indicator variable depend on the time interval. For example, if the calendar event is New Year's Day and the time interval is monthly, a pulse indicator variable will be nonzero for each January and zero otherwise.

In addition to the causal factors, the causal model can contain components described in preceding sections: local level, local trend, and local seasonal. Causal models decompose the time series into causal factors and the local components. This decomposition is useful for demand analysis (promotional analysis and intervention analysis).

With the exception of the Winters Method Multiplicative Model, the preceding forecasting models are linear; that is, the components must be added together to re-create the series. Since time series are not always linear with respect to these components, transformed versions of the preceding forecasting models must be considered when using automatic forecasting. Some useful time series transformations are Logarithmic Square-Root Logistic Box-Cox For example, suppose the underlying process that generated the series has one of the following nonlinear forms:

(Series)=Exp ((Local Level)+(Local Trend)+(Error)) exponential growth model (Series)=(Local Level)×(Local Season)×(Error) multiplicative error model Transforming the preceding series permits the use of a linear forecasting model:

Log(Series)=(Local Level)+(Local Trend)+(Error) log local trend model

Log(Series)=Log(Local Level)+Log(Local Seasonal)+Log(Error) log local seasonal model The preceding transformations are applied to positive-valued time series.

Intermittent demand models (IDM) or interrupted time series models are used to forecast intermittent time series data. Since intermittent series are mostly constant valued (usually zero) except on relatively few occasions, it is often easier to predict when the series departs and how much the series departs from this constant value rather than the next value. An example of an intermittent demand model is Croston's Method.

Intermittent demand models decompose the time series into two parts: the interval series and the size series. The interval series measures the number of time periods between departures. The size series measures the magnitude of the departures. After this decomposition, each part is modeled and forecast independently. The interval forecast predicts when the next departure will occur. The size forecast predicts the magnitude of the next departure. After the interval and size predictions are computed, they are combined (predicted magnitude divided by predicted number of periods for the next departure) to produce a forecast for the average departure from the constant value for the next time period.

In addition to the previously described general families (e.g., classes) of Exponential Smoothing Models (ESM), Unobserved Component Models (UCM), Autoregressive Integrated Moving Average Models (ARIMA), and Intermittent Demand Models (IDM), HPF allows for external models and user-defined models.

External models are used for forecasts that are provided external to the system. These external forecasts may have originated from an external statistical model from another software package, may have been provided by an outside organization (e.g., marketing organization, government agency) or may be based on judgment. External models allow for the evaluation of external forecasts and for tests for unbiasedness.

User-defined models are external models that are implemented with the SAS programming language or the C programming language by the user of HPF software. (HPF is described in the Forecasting Provisional Application.) For these models, users of HPF create their own computational algorithm to generate the forecasts. They are considered external models because they were not implemented in HPF.

With such models and through use of an appropriate forecast function, a decision-making process can generate forecasts (forecast scores) based on future causal factor values with little analytical and computational effort. Due to the iterative nature of decision-making processes, forecast functions make large-scale decision-making processes more tractable. The model specification and forecast function can be stored for use by decision-making processes.

Figure 6:
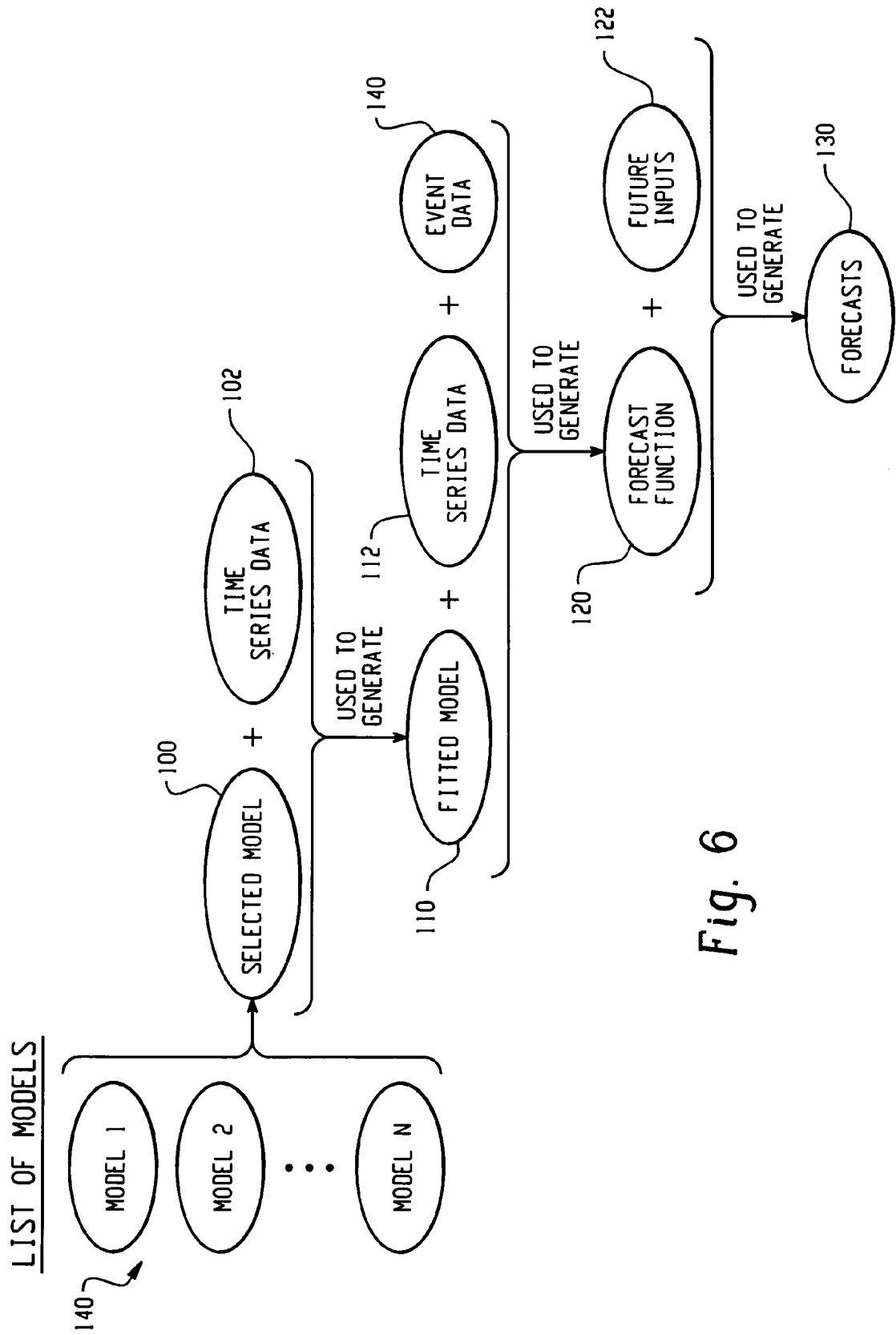

FIG. 6 depicts that event data 140 can be used along with time series data 112 and a fitted model 110 in order to generate a forecast function 120. The factoring in of event data 140 when generating a forecast function 120 can improve the overall forecasting operations because the effects of events on time-stamped data may be an important factor in creating an accurate computer model of the data, for example, to improve the predictive ability of the model. Examples of events that may affect time-stamped data include advertising campaigns, retail promotions, strikes, natural disasters, policy changes, a data recording error, etc. Different types of events, event processing, and event processing methods are discussed in the Forecasting Provisional Application.

Figure 7:
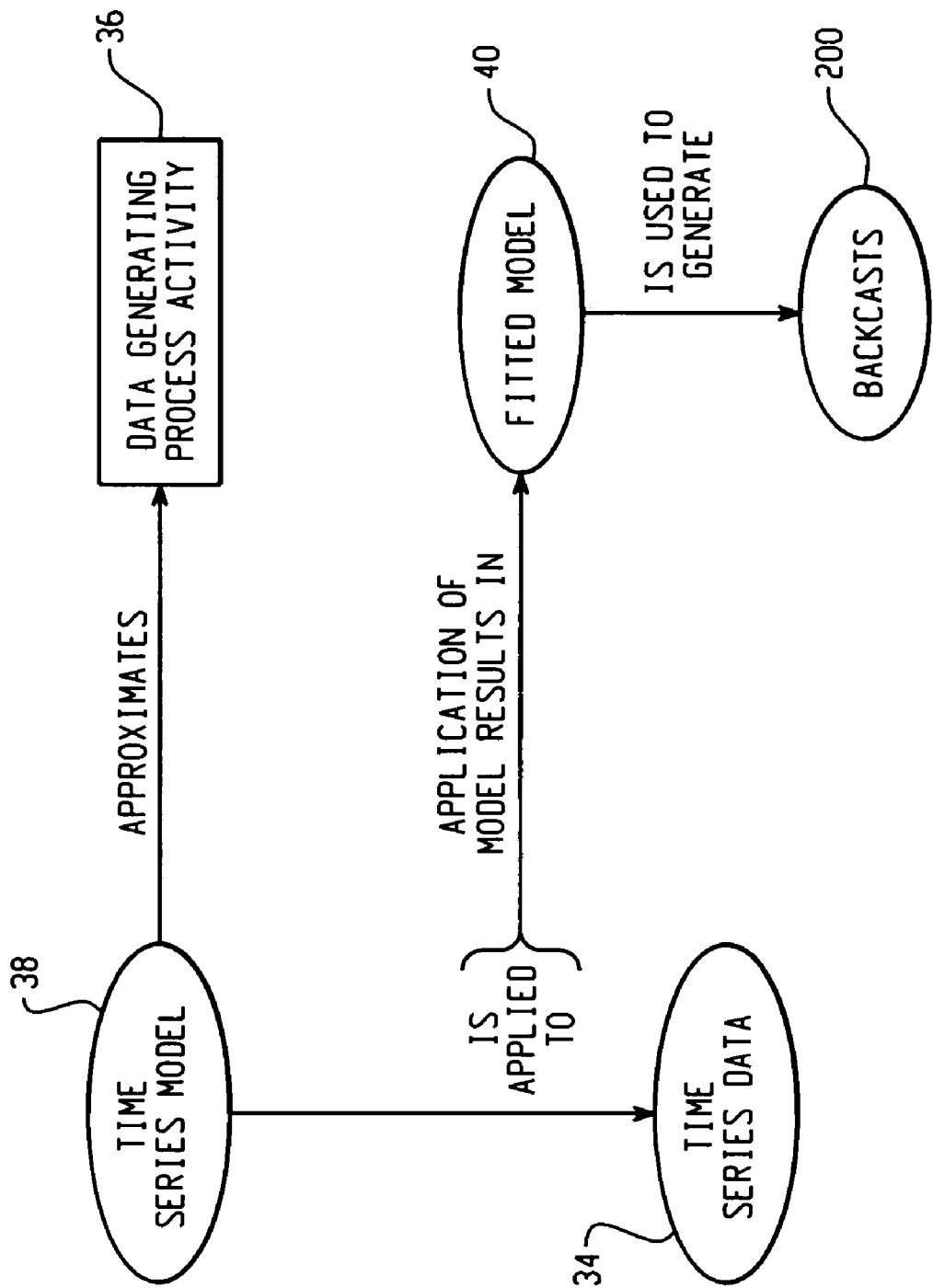
FIG. 7 is a block diagram depicting computer-implemented systems to generate backcasts.

FIG. 7 illustrates that not only can there be predictions of future values but also there can be predictions of values that may have occurred before the time period of the time series. Such predictions can be termed backcasts 200 or imputations and can be useful in many different situations, such as if early historical data of a data generating process activity was not recorded or has been lost. Backcasts 200 can provide a view into how that historical data may have looked.

Automatic forecasting is typically forecasting being performed without the aid (or substantially without the aid) of an analyst skilled in time series analysis techniques or as forecasting when the number of fore-casts is too numerous for an analyst to investigate. Automatic forecasting is usually performed on each time series independently. For each time series and for each candidate model, the parameter estimates are optimized for best results. This means that several optimizations may be required for each time series.

Figure 8:
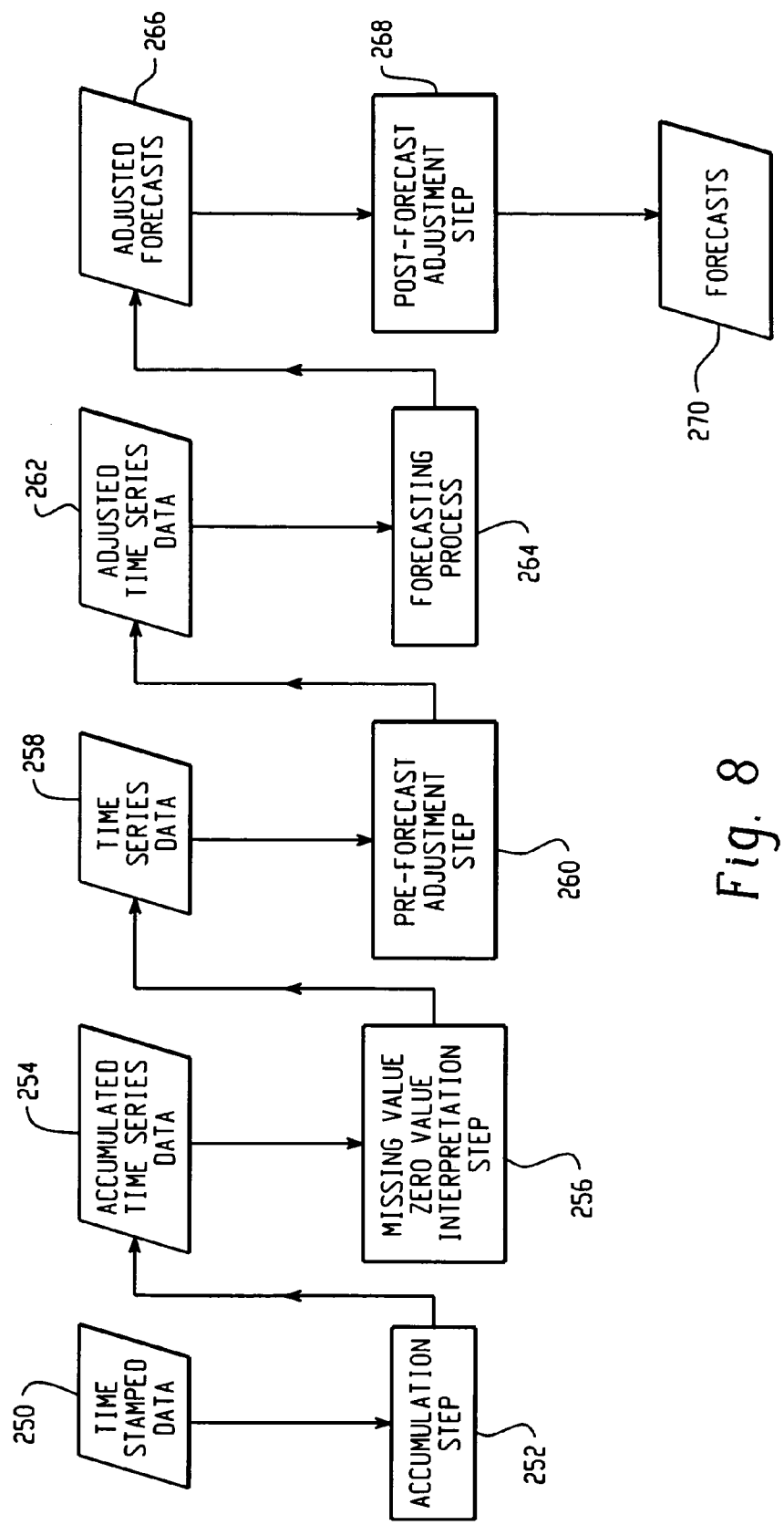
FIG. 8 depicts a processing flow for automatic forecasting.

FIG. 8 depicts a processing flow for automatic forecasting. With reference to FIG. 8, the accumulation step 252 of time-stamped data 250 into time series data 254 is based on a particular frequency. For example, time-stamped data can be accumulated to form hourly, daily, weekly, monthly, or yearly time series. Additionally, the method for accumulating the transactions within each time period is based on a particular statistic. For example, the sum, mean, median, minimum, maximum, standard deviation, and other statistics can be used to accumulate the transactions within a particular time period. As an illustration, if weekly forecasts of the average of the transactions are needed, then the accumulation frequency should be weekly and the accumulation statistic should be the average.

Accumulating the transactional data on a relatively small time interval may require a long forecast horizon. For example, if the data are accumulated on an hourly basis and if it is desired to forecast one month into the future, the forecast horizon is very long and the width of the confidence limits will be very wide toward the end of the horizon.

Once the time-stamped data 250 has been accumulated, there may be no data recorded for certain time periods (resulting in missing values in the accumulated time series). These missing values can represent unknown values (and they should remain missing) or they can represent no activity (in which case they can be set to zero or some other appropriate value). Some transactional databases set missing data at the beginning or end of the time series to zero values. These zero values should be set to missing values. Missing values and zero values are interpreted at 256 before analyzing the time series.

Once the time-stamped data has been accumulated at 252 and interpreted at 256, the time series to forecast may require adjustment at prior to analysis at 264 or post-forecast adjustment 268. By adjusting at 260 the time series for known systematic variations or deterministic components which generates adjusted time series data 262, the underlying stochastic (unknown) time series process may be more readily identified and modeled.

Examples of systematic adjustments are currency-unit conversions, exchange rates, trading days, and other known systematic variations. Examples of deterministic adjustments are advanced bookings and reservations, contractual agreements, and other known contributions or deterministic components.

After analysis at 264, the statistical forecast 266 of the adjusted time series 262 may require post-forecast adjustment at 268 to return forecasts in the original metric.

The pre-forecast and post-forecast adjustments can be operations that are inverses of each other. For example, to adjust a time series for exchange rates, the following can be done:
 1. Divide the time series by the exchange rate.
 2. Analyze and forecast the adjusted time series without regard to exchange rates.

3. Adjust the forecasts, multiplying by the exchange rate. (Division and multiplication are inverse operations of each other.)

For another example, to adjust a time series for advanced bookings, the following can be done:
1. Subtract the advanced bookings from the time series.
2. Analyze and forecast the adjusted time series without regard to advanced booking.
3. Adjust the forecasts, adding the advanced bookings. (Subtraction and addition are inverse operations of each other.)

Systematic variations or deterministic components are included in the time series data. Adjustments are data whose effect is excluded prior to statistical analysis. Causal factors are data whose effect is included with the statistical analysis.

The forecasting process 264 discussed in FIG. 8 can include:
- a time series diagnostic step
- a model selection step
- a parameter estimation step
- a forecasting step
- a evaluation step
- a performance step
- a forecast function (score file) generation step With respect to the time series diagnostic step, given the time series data, the time series diagnostics subset the potential list of candidate models to those that are judged appropriate to a particular time series. Time series that have trends (deterministic or stochastic) should be forecast with models that have a trend component. Time series with seasonal trends (deterministic or stochastic) should be forecast with models that have a seasonal component. Time series that are nonlinear should be transformed for use with linear models. Time series that are intermittent should be forecast with intermittent models. Applying a seasonal model to a non-seasonal time series, particularly one with a short history, can lead to over parameterization or false seasonality. Applying a linear model to a nonlinear time series can lead to underestimation of the growth (or decline). Applying a non-intermittent model to an intermittent series will result in predictions biased toward zero.

If it is known, a priori, that a time series has a particular characteristic, then the diagnostics could be overridden and the appropriate model should be used. For example, if the time series is known to be seasonal, the diagnostics could be overridden to choose a seasonal model.

After the candidate models have been subset by the diagnostics, each model is fit to the data (with the holdout sample excluded). After model fitting, the one-step-ahead forecasts are made in the fit region (in-sample) or the multistep-ahead forecasts are made in the holdout sample region (out-of-sample). The model selection criterion is used to select the best performing model from the appropriate subset of the candidate models. As described above, the model selection criteria are statistics of fit.

If the length of the time series is short, holdout sample analysis may not be possible due to a lack of data. In this situation, the full-range of the data should be used for fitting and evaluation. Otherwise, holdout sample analysis is recommended.

Once the best forecasting model is selected from the candidate models, the selected model is fit to the full range of the data to obtain the most accurate model parameter estimates. If the holdout sample is excluded in this step, the most recent and influential observations would be ignored.

Most univariate forecasting models are weighted averages of the past data, with the most recent having the greatest weight.

Once the model parameters are estimated, forecasts (predictions, prediction standard errors, prediction errors, and confidence limits) are made using the model parameter estimates, the model residual variance, and the full-range of data. If a model transformation was used, the forecasts are inverse transformed on a mean or median basis.

When it comes to decision-making based on the forecasts, the analyst decides whether to base the decision on the predictions, lower confidence limits, upper confidence limits or the distribution (predictions and prediction standard errors). If there is a greater penalty for over predicting, the lower confidence limit could be used. If there is a greater penalty for under predicting, the upper confidence limit could be used. Often for inventory control decisions, the distribution (mean and variance) is important.

Once the forecasts are made, in-sample statistics of fit are computed based on the one-step-ahead forecasts and the actual data. Such a technique is also described in the Forecasting Provisional Application. These statistics can be used to identify poorly fitting models prior to making business decisions based on these forecasts. If forecasts do not predict the actual data well, they can be flagged to signal the need for more detailed investigation by the analyst.

In addition to the statistics of fit, distribution and correlation analysis of the prediction errors can help evaluate the adequacy of the forecasting model.

The previous steps are used to forecast the future. This post forecast evaluation judges the performance of the forecasting model. After forecasting future periods, the actual data becomes available as time passes. For example, suppose that monthly forecasts are computed for the next three months into the future. After three months pass, the actual data are available. The forecasts made three months ago can now be compared to the actual data of the last three months.

The availability of the new data can produce the following questions:
How well are you forecasting?
Why are you forecasting poorly?
If you were forecasting well before, what went wrong?

When the statistics of fit are used for performance measures, the statistics are computed from the previous predictions and the newly available actual data in the forecast horizon. For example, the MAPE can be computed from the previous predictions and the newly available actual data in the three-month forecast horizon.

Another useful measure of forecast performance is determining whether the newly available data fall within the previous forecasts' confidence limits. For example, performance could be measured by whether or not the newly available actual data fall outside the previous forecasts' confidence limits in the three-month forecast horizon.

If the forecasts were judged to be accurate in the past, a poor performance measure, such as actual data outside the confidence limits, could also be indicative of a change in the underlying process. A change in behavior, an unusual event, or other departure from past patterns may have occurred since the forecasts were made.

Such departures from past trends may be normal, and indicate the need to update the forecasting model selection for this variable, or they can be a warning of special circumstances that warrant further investigation.

Large departures from forecast can sometimes reflect data errors, changes in policies or data definitions (for example, what exactly is counted as sales), fraud, or a structural change in the market environment.

Once the selected model is fit to the full range of the data, a summary of model parameter estimates and the final states (historical time series information) are stored in a forecast score file. Subsequent decision-making processes can then use the forecast score file for scenario (what-if) analysis, stochastic optimization, or goal seeking.

Figure 9:
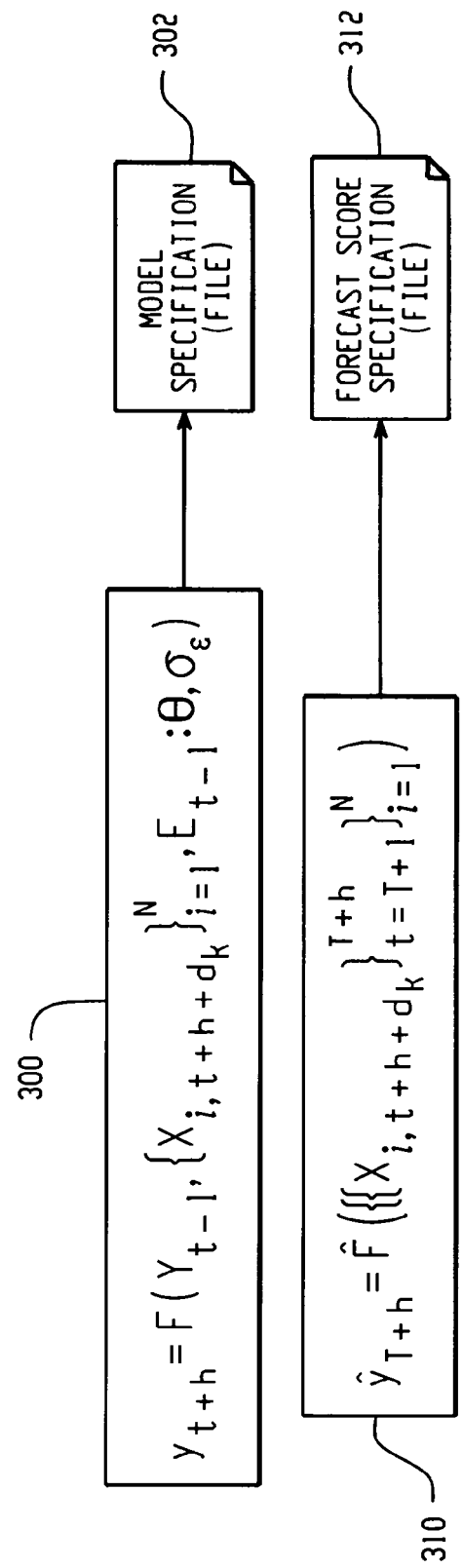
FIG. 9 is a block diagram depicting specification files being generated for use in generating forecasts.

The storage of the different models and forecasts that are generated for one or more time series can be accomplished in many different ways. For example and as illustrated in FIG. 9, a model (e.g., model 300) can be stored in a model specification file, and a forecast function (e.g., forecast function 310) can be stored in a forecast score specification file 312.

A model specification indicates a specific type of forecasting model be fit to the historical data for use in producing forecasts. Given a time series and a model specification, a forecast for the time series is generated by applying the statistical concepts associated with model specification. A model specification is not dependent on any specific time series data; a given specification can be used for many different series.

Associated with a model specification is a list of symbols representing the time series to which the specification applies. These symbols are mapped to actual time series variables in the input data set, or to event specifications, before the model specification can be used to created a fitted model for forecasting.

The following time series models are could be used: ESM, IDM, ARIMAX, UCM, EXTERNAL, USER-DEFINED (which are discussed in the Forecasting Provisional Application), etc. All of the models are implemented to allow nonlinear transformations (Log, Square Root, Logistic, Box-Cox) of the dependent and independent time series.

A forecast model score file encodes the information needed to compute forecasts for a time series given the future values of the causal factors. Given a time series and a (diagnosed, selected, or specified) model specification, a fitted time series model is estimated. Given a fitted model and a time series, a forecast model score file can be generated that efficiently encapsulates all information needed to forecast the series when future inputs are provided.

Forecast model score files can be used for scenario analysis, goal seeking, or stochastic optimization. SAS functions are provided that can reference the forecast model score files to calculate forecasts from the fitted model given alternative inputs. These functions can be used in user-written SAS Data Step programs or in SAS analytical procedures such as PROC MODEL or PROC NLP.

Figure 10:
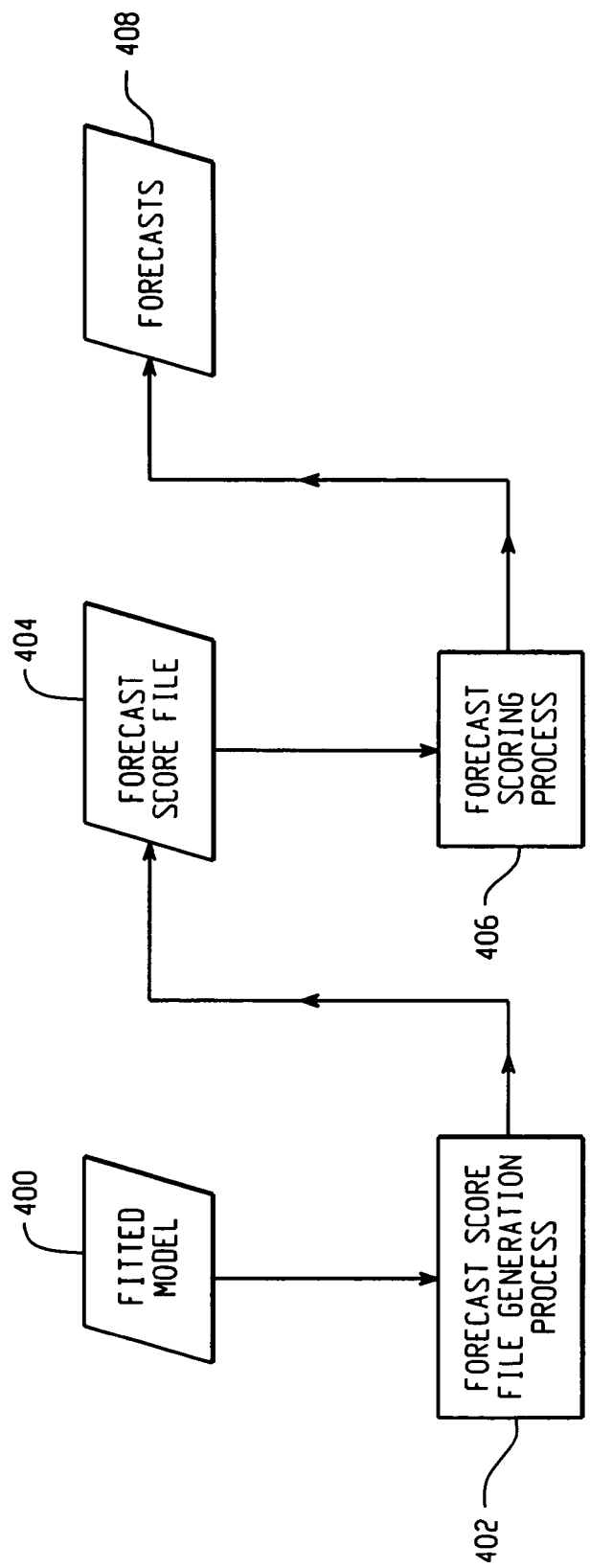
FIG. 10 is a block diagram illustrating how a score file can be used in the process of generating forecasts.

FIG. 10 shows how such storage files (e.g., forecast score file 404) can be used in the process of generating forecasts 408. For example, a fitted model 400 generates via process 402 a forecast score file 404. Using the forecast score file 404 and given future values of the controllable causal factors, the forecast scoring process 406 generates forecasts 408.

Figure 11:
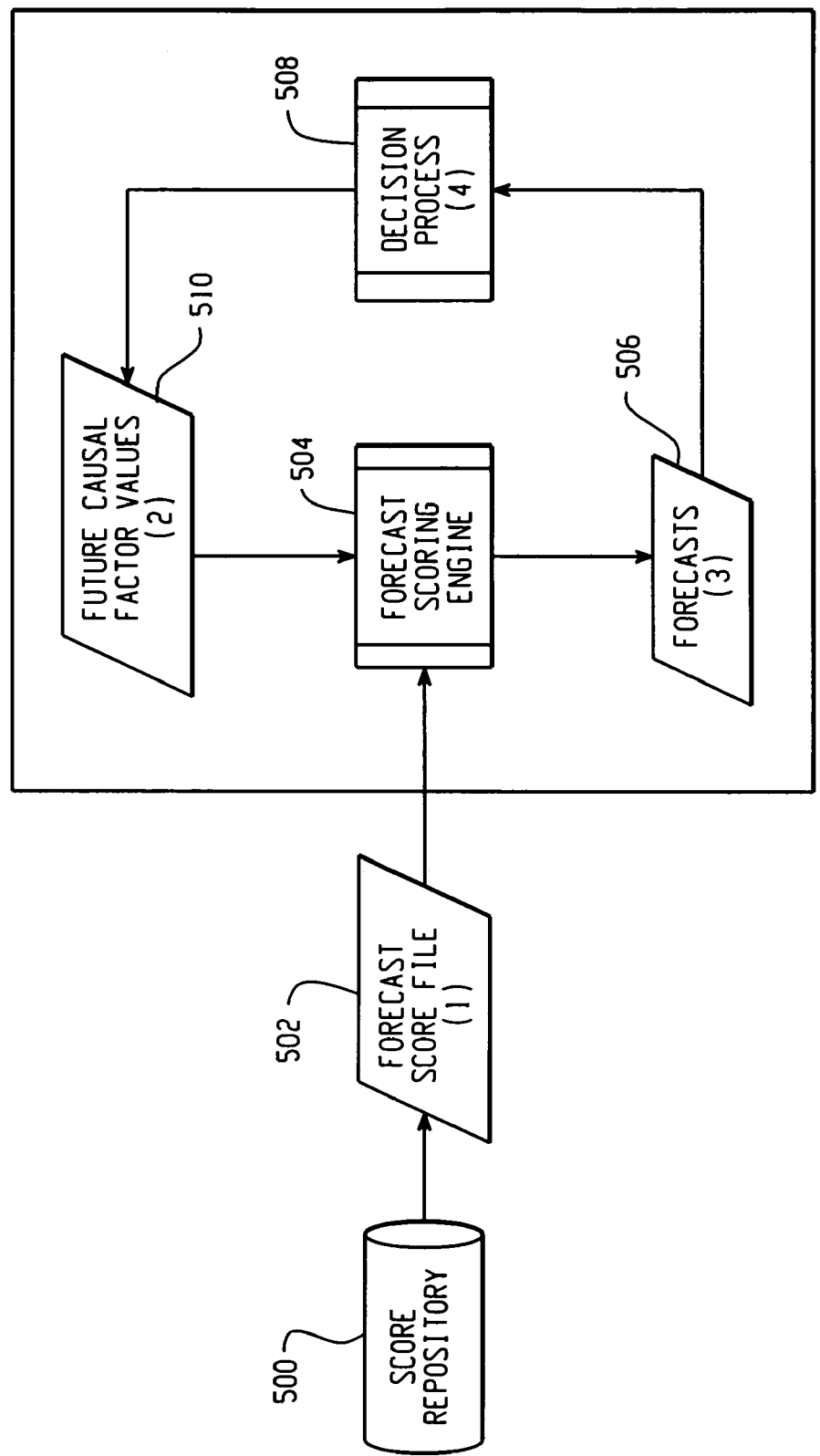
FIGS. 11–14 are block diagrams depicting different decision-making scenarios.

As another illustration, FIG. 11 depicts use of a forecast score file 502 in a decision-making process. For each time series to score, the forecast scoring process works as follows:
1. The forecast score file 502 is read from the score repository (storage) 500.
2. The future values of the controllable causal factors 510 are provided by the decision-making process 508.
3. Using the forecast score file 502 and the future values 510, the forecast scoring process 504 generates forecast results 506.
4. Steps 2 and 3 are repeated as needed by the decision-making process 508.

As can be seen by the above steps, other than the decision process 508 most of the computational effort takes place in the forecast scoring engine 504, which evaluates the forecast function based on the future values 510 of the causal factors. This computational effort is very low when compared to the process that generated the forecast (function) score file 502, which makes the iterative nature of the decision-making process 508 more tractable.

Figure 12:
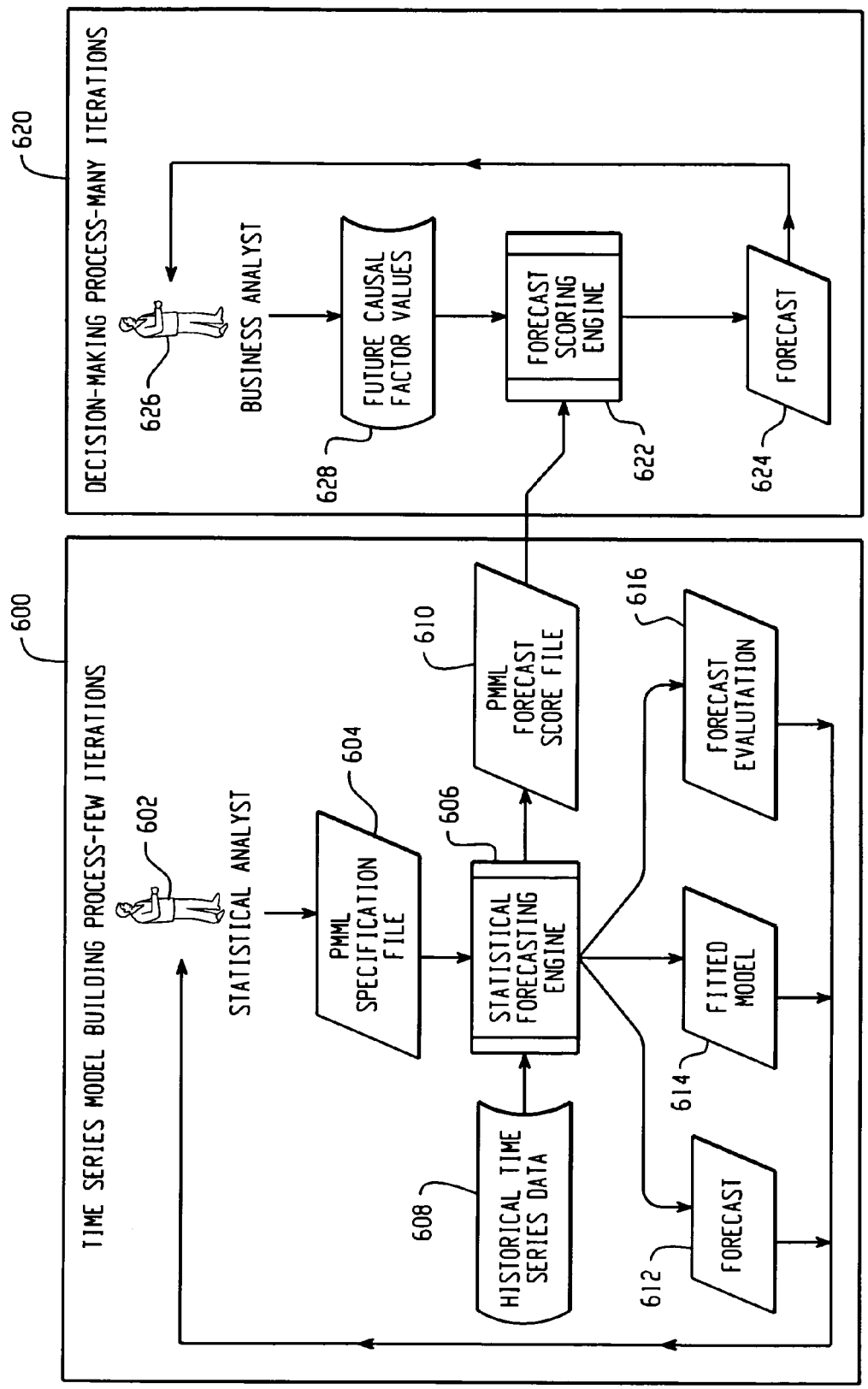

FIG. 12 depicts another example wherein an organization desires to predict the demand for a product or service, that the demand is influenced by its sales price and by its advertising expenditures, and that this data is recorded over time. Because the data represents a time series, a time series model can be selected by a statistical analyst 602 (or an automated program) that models the demand for a product or service. A statistical model can be stored in concrete form in a model specification file 604.

Given a time series 608 and a model specification 604, a fitted time series model 614 can be estimated. Given a fitted model 614 and a time series 608, a forecast function can be can be generated via a statistical forecasting engine 606 that efficiently encapsulates all information needed to provide a forecast 612 of the series when future values of price and advertising are provided and stored in concrete form in a forecast score file 610. The engine 606 can also generate a forecast evaluation 616. The forecast evaluation 616 can be useful to the statistical analyst to determine how well the forecast performed. Based upon the evaluation 616, the statistical analyst 602 can determine whether another iteration (e.g., using a different model) is needed to improve performance of the forecasting.

After the time series model building process 600 is completed, the forecast score file 610 is provided to a decision-making process 620. The decision-making process 620 can be used for scenario analysis in order to help answer the question: what happens to demand if the organization increases the sales price and decreases the advertising expenditures? In this case, the decision process 620 is interactive in nature. The user 626 (e.g., a business analyst) specifies the future causal factors 628, and the forecast scoring engine 622 provides the forecasts 624 that are then observed by the user 626 for the next interaction.

Figure 13:
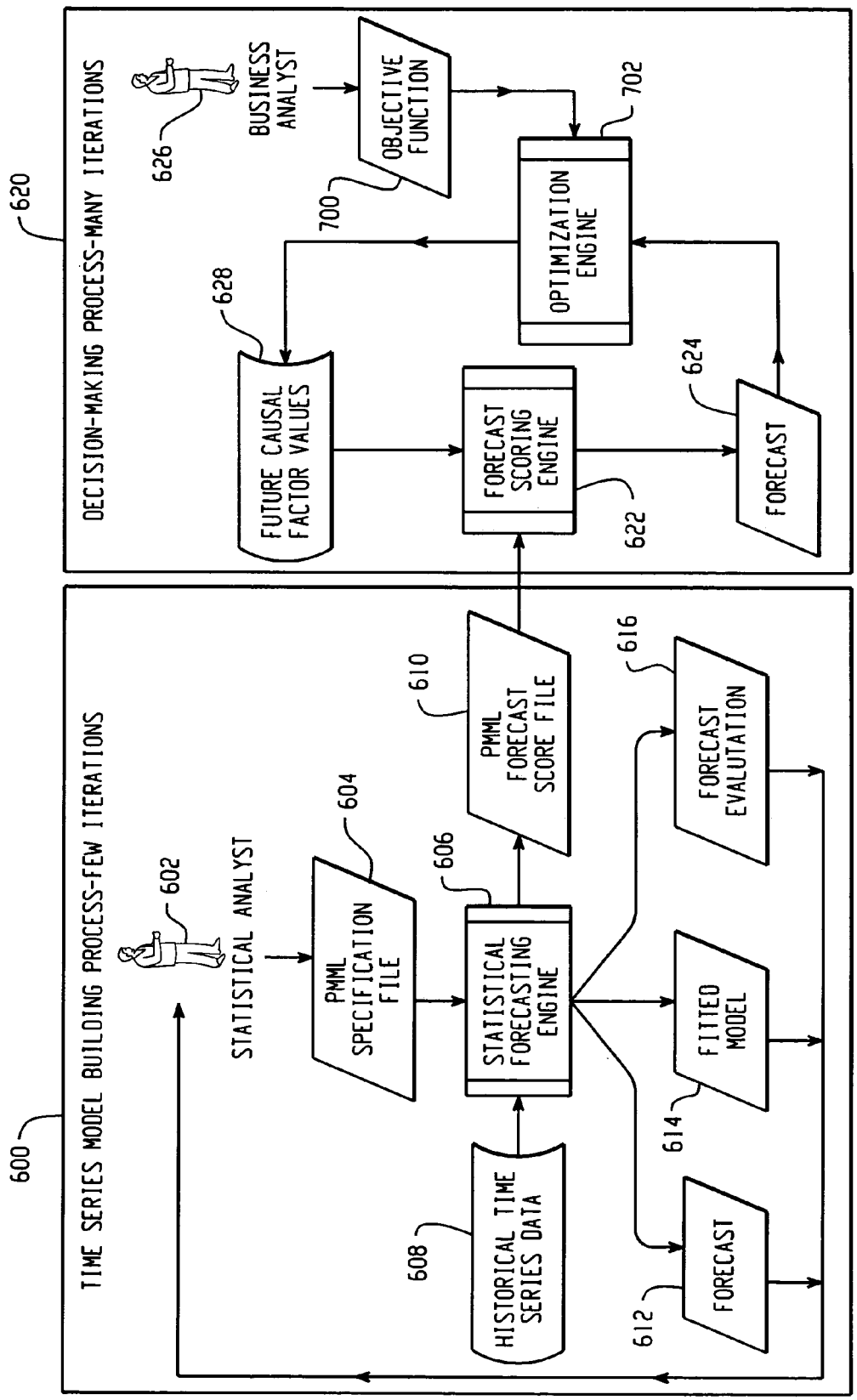

Other scenarios can be addressed as well, such as an optimization scenario which is illustrated in FIG. 13. Optimization can help answer the question: what is the optimal sales price and advertising expenditure combination that maximizes profit? In this case, the decision process 620 is iterative in nature. The user 626 specifies an objective function 700 to the optimizing software 702. The optimizer 702 algorithmically varies the future causal factors 628, and the forecast scoring engine 622 provides the forecasts 624 to be evaluated by the objective function 700.

Figure 14:
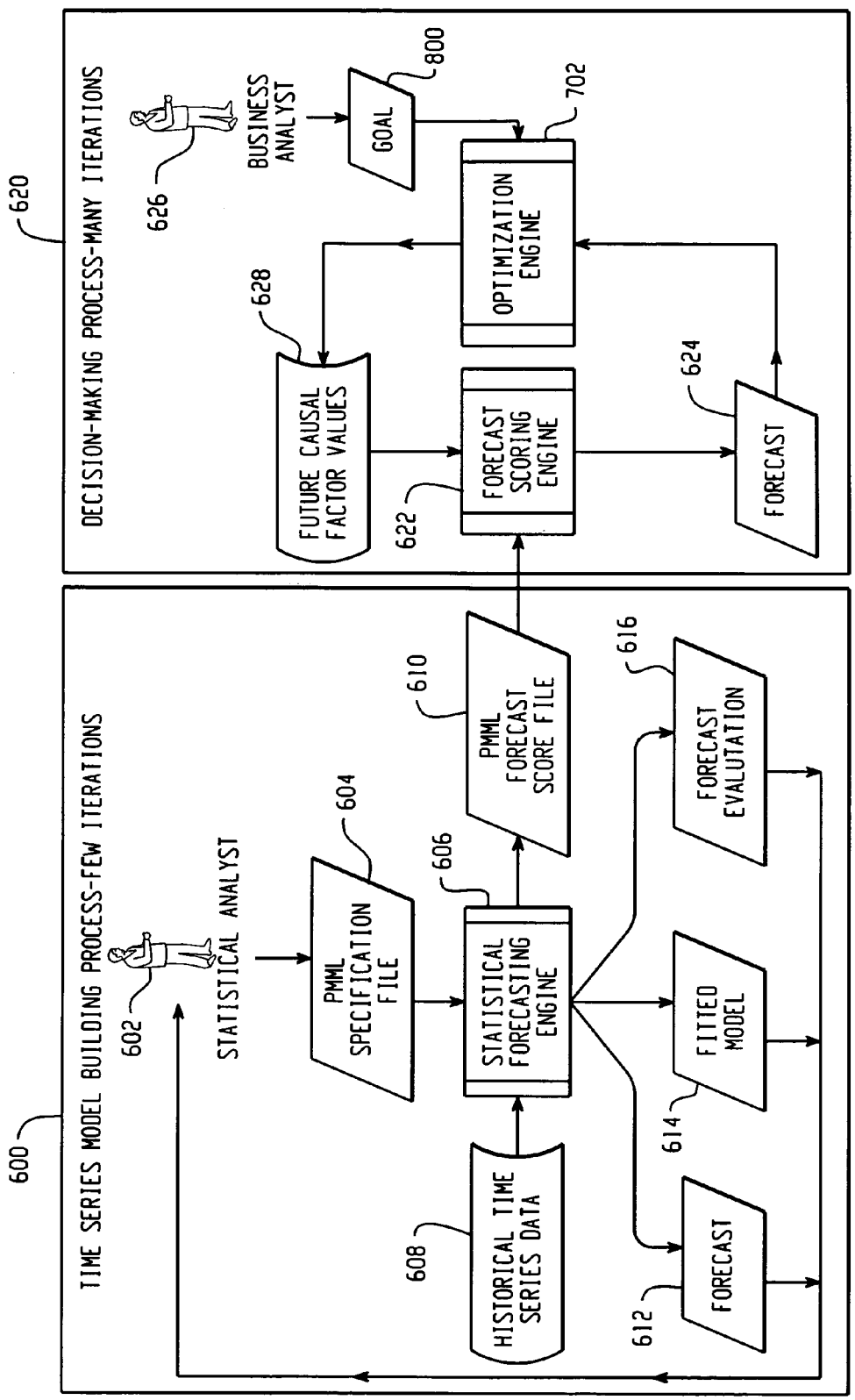

FIG. 14 illustrates the use of a forecast function in a goal seeking scenario. Goal seeking can help answer the question: what are the combinations of sales price and advertising expenditures that achieve a specified sales target? In this case, the decision process 620 is iterative in nature. The user 626 specifies a goal 800 to the optimizing software 702. The optimizer 702 algorithmically varies the future causal factors 628, and the forecast scoring engine 622 provides the forecasts 624 to be evaluated, whether or not the goal is achieved.

The following provides a scenario wherein time series models are used to solve a dynamic price optimization problem. These models take into account the current and future effects of price changes or other market actions (such as advertising). Automatic selection among several candidate models can be used when many SKUs (i.e., a stock keeping unit which is an item at a particular geographic location and is typically represented by a UPC identifier) are involved or when expertise is limited. Once the appropriate form of the time series model is determined, the forecast function can be created from the historical data and the estimated parameters. Varying decision variables (prices, advertising, etc.) that are inputs to the forecast function can control future demand. Assuming that demand can be effectively controlled, varying future decisions constrained by business rules can maximize profits. Below is a summary of the equations discussed in the example:

| | |
|---|---|
| $Q_T = \{q_i\}_{i=1}^T$ | demand series in units |
| $P_T = \{p_t\}_{t=1}^T$ | price series (per unit demand) |
| $q_t = F(Q_{t-1}, P_t; \theta) + \epsilon_t$ | demand model specification |
| $q_t = F(Q_{t-1}, P_t; \hat{\theta}) + \epsilon_t$ | fitted demand model |
| $q_t = \hat{F}(P_t)$ | demand score |
| $\pi^k = \sum_{i=1}^{h}\left[\hat{F}(\tilde{p}_j^k)(\tilde{p}_{T+i}^k - vc_{T+i}) - fc_{T+i}\right]$ | profit equation |
| $\pi^* = \max_k \{\pi^k\}$ | optimize profits |

These equations are used to determine the optimal marketing decisions (price, advertising expenditure, or other) that maximize profits.

The models in this example are dynamic models (time series models) where the marketing decision is the price. However it should be understood that such a process can apply to any marketing decision (e.g. advertising). Moreover, although this example is related to single product, it could be extended to multiple products (cross-effects) using vector time series models. In this example, the dynamic model receives the following historical and future data:

Historical Data

| | |
|---|---|
| T | number of observations |
| $\{q_t\}_{t=1}^T$ | demand series in units |
| $X_t = \{x_{i,t}\}_{i=1}^N$ | exogenous input series (possibly transformed) cannot be controlled (e.g. weather) |
| $\{p_t\}_{t=1}^T$ | price series (per unit demand) |
| s | seasonality (for weekly data it is 52) |

Future Data

| | |
|---|---|
| h | forecast horizon (maybe infinite) |
| $\{X_t\}_{t=T+1}^{T+h}$ | future exogenous inputs (may be known or unknown) |
| $\{\tilde{p}_t^k\}_{t=T+1}^{T+h}$ | future prices (decision variables where k represent possible pricing policies) |

In the context of a general non-linear time series model, the current demand is a function of the past demand, the current and past exogenous inputs, the current and past price, and the current and past random disturbances, $\{a_j\}_{j=1}^t$.

$$q_t = f\left(\{q_j\}_{j=1}^{t-1}, \{X_j\}_{j=1}^t, \{p_j\}_{j=1}^t, \{a_j\}_{j=1}^t\right)$$

The forecast for future demand is a function of the past demand, the actual/forecast and past exogenous inputs, the current and past price, and the past random disturbances.

$$\hat{q}_{T+i}^k = f\left(\{q_j\}_{j=1}^T, \{X_j\}_{j=1}^{T+i}, \{\tilde{p}_j^k\}_{j=1}^{T+i}, \{a_j\}_{j=1}^T\right)$$

The general linear transfer function models are a subset of the general non-linear time series model:

$$(1-B)^d(1-B^s)^D \log(q_t) = \mu_t + r_t + \epsilon_t$$

where B is the backshift operator $B^s y_t = y_{t-s}$, and d and D represent simple and seasonal differencing where (d$\in$ {0,1, 2} and D$\in$ {0,1}). The demand may or may not be transformed (log) as shown. The average demand may also be subtracted from the demand. Percent change may also be used. 'Log' is often used but will be used to indicate any transformation.

The stationary form of this demand model has the following components:

(stationary demand)=(mean)+(control)+(disturbance)

The transfer function filter is used to model the effect of the exogenous variable on current and future demand.

$$\mu_t = \mu + \sum_{i=1}^N \left[B^{k_i}(1-B)^{d_i}(1-B^s)^{D_i}\frac{\omega_i(B)\omega_{s,i}(B)}{\delta_i(B)\delta_{s,i}(B)}x_{i,t}\right]$$

In its simplest (static) regression form:

$$\mu_t = \mu + \sum_{i=1}^N \beta_i x_{i,t} \text{ where } \{\beta_i\}_{i=1}^N$$

are the exogenous variable regression parameters

The control filter is used to model the effect of the price (or other control such as advertising) on current and future demand.

$$r_t = B^{k_p}(1-B)^{d_p}(1-B^s)^{D_p}\frac{\omega_p(B)\omega_{s,p}(B)}{\delta_p(B)\delta_{s,p}(B)}\log(p_t)$$

Cross price effects could be modeled using a similar form. The price may or may not be transformed (log) as shown. The average base price may also be subtracted from the price. Percent change may also be used. 'Log' is often used but will be used to indicate any transformation. In its simplest (static) regression form:

$r_t = \eta \log(p_t)$ where $\eta$ is the price elasticity

A disturbance filter is used to model the effect of the unexplained disturbance on current and future demand.

$$\varepsilon_t = \frac{\theta(B)\theta_s(B)}{\phi(B)\phi_s(B)} a_t \quad a_t = iid(0, \sigma_a)$$

or white noise

In its simplest (static) form:

$\epsilon_t = a_t$

In its simplest form, a linear transfer function model has the (static) regression form:

$$\log(q_t) = \mu + \sum_{i=1}^{N} \beta_i x_{i,t} + \eta \log(p_t) + a_t$$

Based upon the above a fitted model can be generated wherein the above polynomial parameters, $\xi(B)$, require only the historical data to obtain the parameter estimates, $\hat{\xi}(B)$ and do not use the future pricing decisions. For the simple regression form, $\{\hat{\mu}, \hat{\beta}_i, \hat{\eta}, \hat{\sigma}_a\}$ are the estimated parameters.

Assuming that the estimated parameters are true, forecast can be generated from the historical data. For $t=T+1$ to $T+h$, each time period in the forecast horizon (i.e., future time-varying mean (exogenous inputs)), $$\hat{\mu}_t = \hat{\mu} + \sum_{i=1}^{N}\left[ B^{k_i}(1-B)^{d_i}(1-B^s)^{D_i} \frac{\hat{\omega}_i(B)\hat{\omega}_{s,i}(B)}{\hat{\delta}_i(B)\hat{\delta}_{s,i}(B)} x_{i,t} \right]$$

where for $t>T$, $x_{i,t}=\hat{x}_{i,t}$ if $x_{i,t}$ is unknown.

For the above case:

$$\hat{\mu}_t = \hat{\mu} + \sum_{i=1}^{N} \hat{\beta}_i x_{i,t}$$

The future time-varying control can be used for assessing different Price Decisions:

$$\hat{r}_t^k = B^{k_p}(1-B)^{d_p}(1-B^s)^{D_p} \frac{\hat{\omega}_p(B)\hat{\omega}_{s,p}(B)}{\hat{\delta}_p(B)\hat{\delta}_{s,p}(B)} \log(p_t)$$

where for $t>T$, $p_t = \tilde{p}_t^k$ are future decisions where the superscript k represents a possible pricing policy.

For the above case:

$\hat{r}_t^k = \hat{\eta} \log(\tilde{p}_t^k)$

The future disturbance terms can be expressed as follows:

$$\hat{\varepsilon}_t = \frac{\hat{\theta}(B)\hat{\theta}_s(B)}{\hat{\phi}(B)\hat{\phi}_s(B)} a_t$$

where for $t>T$, $a_t=0$

For the above case:

$\hat{\epsilon}_t = a_t$

The future demand can be expressed as follows:

$\hat{q}_t^k = \exp[S(B)S(B^s)(\hat{\mu}_t + \hat{r}_t^k + \hat{\epsilon}_t)]$ where $S(B)$ and $S(B^s)$ represents simple and seasonal integration/summation.

For the above case:

$$\hat{q}_t^k = \exp\left[\hat{\mu} + \sum_{i=1}^{N} \hat{\beta}_i x_{i,t} + \hat{\eta}\log(\tilde{p}_t^k) + a_t\right]$$

Given the historical data and assuming the parameter estimates are true, only $\hat{r}_t^k$ is influenced by the future decisions, $\tilde{p}_t^k$, and $\tilde{r}_t^k$ is linear transformation of the future decisions.

$$\hat{r}_{T+i}^k = \hat{A}'_{T+i} + \hat{L}'_{T+i}\{\log(\tilde{p}_j^k)\}_{j=T+1}^{T+i}$$

where $\hat{A}'_{T+i}$, $\hat{L}'_{T+i}$ are fully determined by the parameter estimates and the historical data.

Therefore, the forecast function with respect to the future decisions is log-linear.

$$\hat{q}_{T+i}^k = \exp\left[\hat{A}_{T+i} + \hat{L}_{T+i}\{\log(\tilde{p}_j^k)\}_{j=T+1}^{T+i}\right]$$

where $\hat{A}_{T+i}$, $\hat{L}_{T+i}$ are fully determined by the parameter estimates and the historical data.

Given a pricing policy (k), future profits can be determined as follows:

(profits)=(revenue)−(variable cost)−(fixed cost)

Note that profits could more complex if salvage/disposal costs, inventory costs, transaction costs, menu costs, and other costs are considered. Additionally, the current inventory state could also influence the optimization:

$$\pi^k = \sum_{i=1}^{h} \left[\hat{q}_{T+i}^k(\hat{p}_{T+i}^k - vc_{T+i}) - fc_{T+i}\right]$$

$$\pi^k = \sum_{i=1}^{h} \left[\exp\left[\hat{A}_{T+i} + \hat{L}_{T+i}\{\log(\tilde{p}_j^k)\}_{j=T+1}^{T+i}\right](\hat{p}_{T+i}^k - vc_{T+i}) - fc_{T+i}\right]$$

The optimization of future profits can be expressed as follows:

$$\pi^* = \max_k \{\pi^k\}$$

There may be constraints on the above optimization such as price range, storage capacity, and other business rules.

The pricing policy k, $$\{\tilde{p}_t^k\}_{t=T+1}^{T+h},$$

that maximizes profits is the result of the above optimization can be expressed as follows:

$$\frac{\partial \pi^*}{\partial \tilde{p}_{T+i}^*} = \sum_{i=1}^{h} \frac{\partial}{\partial \tilde{p}_{T+i}^*} \left[ \exp[\hat{A}_{T+i} + \hat{L}_{T+i} \{\log(\tilde{p}_j^k)\}_{j=T+i}^{T+i}] (\tilde{p}_{T+i}^k - vc_{T+i}) \right] = 0$$

Figure 15:
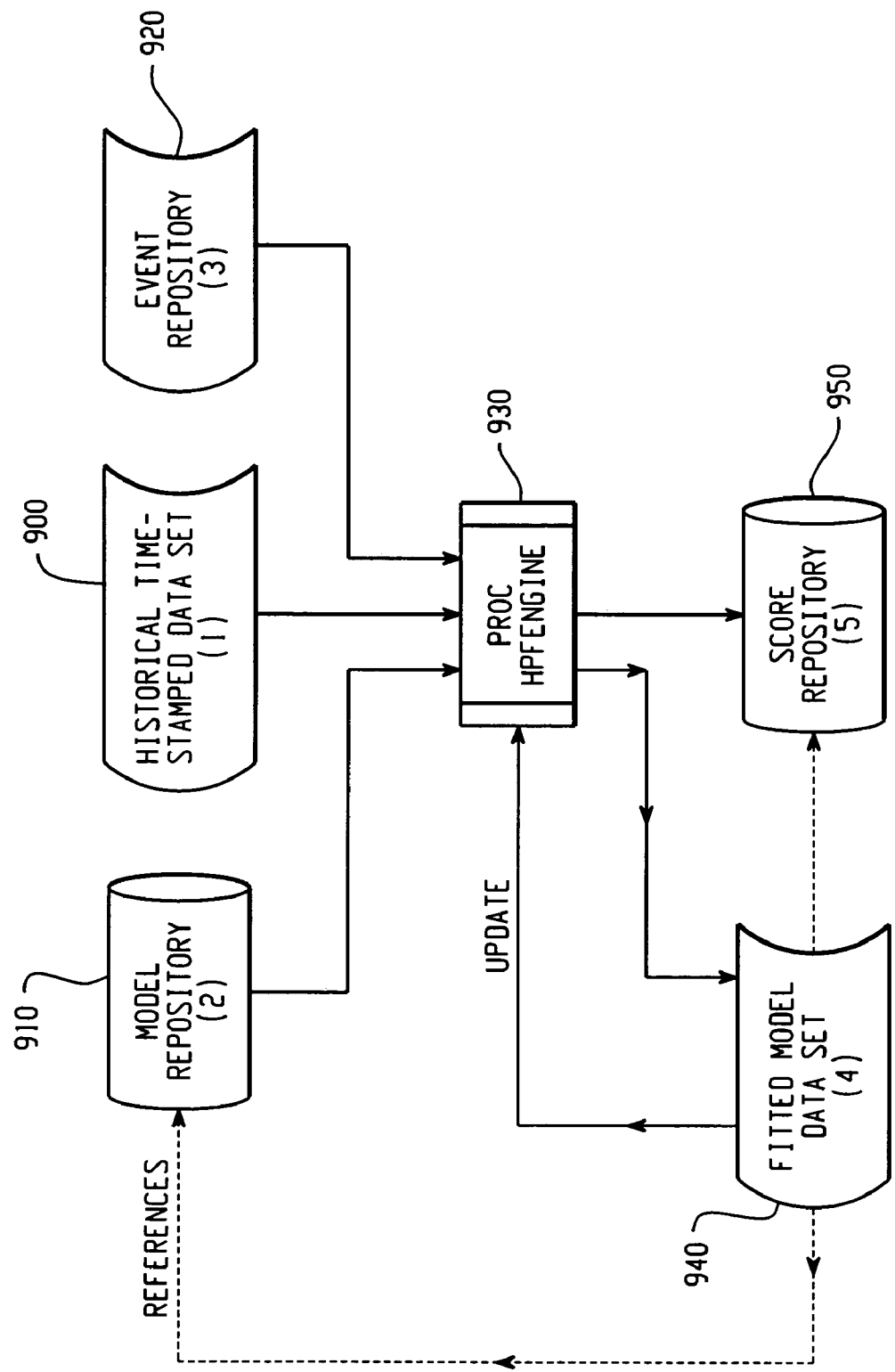
FIG. 15 is a block diagram depicting the creation of a fitted model and its associated forecast score file.

A variety of software programs can be used to perform the operations associated with this example as well as with the methods and systems described herein. For example within the SAS programming environment and as described in Tab A of the Forecasting Provisional Application, time series model processing can be handled in SAS High-Performance Forecasting software (HPF). The HPFENGINE procedure (i.e., a forecasting software engine discussed in Tab A of the Forecasting Provisional Application) creates forecast score files. The forecast score files are stored in a score repository, which for example could be a SAS catalog entry or file in a system directory. Using the forecast scoring file and the future causal factor values, the HPFSCSUB routine (e.g., the forecast scoring software engine discussed in the Forecasting Provisional Application) generates the forecasts. Given a fitted model, the forecast score file can be created by the HPFENGINE procedure. The HPFENGINE procedure can also be used to automatically select the time series model that is used to create the fitted model. Leonard (2004) provides details of automatic model selection and which is referenced in the Forecasting Provisional Application. The creation of the fitted model and its associated forecast score file is shown in FIG. 15. For each historical time series to forecast, an automatic forecasting system works as follows:

1. The time-stamped data are read from the time-stamped data set 900 and accumulated, interpreted, and adjusted to form the time series to forecast.
2. The modeling information (model specifications and model selection list) associated with the time series is read from the model repository 910.
3. The calendar events associated with each model specification are read from the event repository 920.
4. Using the time series, modeling information, and calendar events, the forecasting engine 930 (e.g., PROC HPFENGINE which is described in the Forecasting Provisional Application) creates or uses (updates) the fitted model 940.
5. From the fitted model 940, forecast score files are generated and stored in the score repository 950.

As shown in this process, it is noted that different repositories can be used if desired, especially if there are many time series to forecast. Large-scale automatic forecasting requires the efficient management of large amounts of information about each time series.

An event repository stores information about calendar events using a brief description of each event. Calendar events can be represented by indicator variables that could be stored in the time series data. However, because the influential calendar events can vary from series to series, there may be too many to store efficiently and many calendar events will be redundant, making updates difficult. Therefore, a brief description of the calendar event can be stored, to reproduce the indicator variable in the computer's memory when needed, and to store the calendar events independently of the time series data, to allow the reuse and update of the calendar events. Additionally, the event repository can be used by more than one time-stamped data set. See the Forecasting Provisional Application, Chapter 9, "The HPFEVENTS Procedure," for information about creating event definitions and storing them in an event repository.

A model specification repository stores information about time series models (model specification) and how to select an appropriate time series model (model selection list) when given a particular time series. A model specification can be assigned to each time series. However, because the model specification can vary from series to series, there may be too many to store efficiently and many model specifications will be redundant, making updates difficult. Therefore, it is better to store model specifications independently of the time series data to allow the reuse and update of the model specification. Additionally, the model specification repository can be used by more than one time-stamped data set.

A fitted model repository stores information about the selected model specification and its parameter estimates for each time series. Because each time series has different parameter estimates, the fitted model repository will often be large. There is one fitted model repository for each time-stamped data set.

A forecast results repository stores information about the forecasts, forecast evaluations, and forecast performance for each time series. The forecast results repository consists of several data sets. Since each time series has forecasts and statistics of fit associated with these forecasts, the forecast results repository will often be large. There is one forecast results repository for each time-stamped data set.

A score repository stores information about how to score each time series. Because each time series has a different score, the score repository will often be large because it summarizes information contained in the model specification repository, fitted model repository, as well as the final states (historical time series data). There is one score repository for each time-stamped data set.

The forecast score file can be used by the HPFSCSUB routine to generate forecasts. Since the HPFSCSUB routine is a SAS language function, it can be used in SAS software components that use the SAS language. The HPFSCSUB function uses score files to produce forecasts outside of the HPFENGINE procedure. Being a function, it is particularly well suited for use within other SAS programming contexts, such as the DATA step, or procedures that permit the specification of functions, such as the NLP procedure. The input is a reference to the score function, the horizon, and future values of any inputs.

The syntax for the HPFSCSUB routine is described below:

CALL HPFSCSUB( <forecast-score-fileref>, <horizon>,
   'X1', <input-1—1>, <input-1-2>, . . . , <input-1-horizon>,
   . . .
   'Xj', <input-j-1>, <input-j-2>, . . . , <input-j-horizon>,
   <output-type>, <output-1>, . . . , <output-horizon>);

wherein:
<forecast-score-fileref>: SAS file reference that contains the forecast function information.
<horizon>: forecast horizon or lead.
Xj: indicates that the next horizon values are the future exogenous inputs for variable j.
<input-j-h>: is a controllable input value for the j-th variable at horizon h.
<output-type>: one of the following: PREDICT, STDERR, LOWER, UPPER. Indicates what will be returned in the output variables.
<output-h>: the subroutine output at horizon h.

Figure 16:
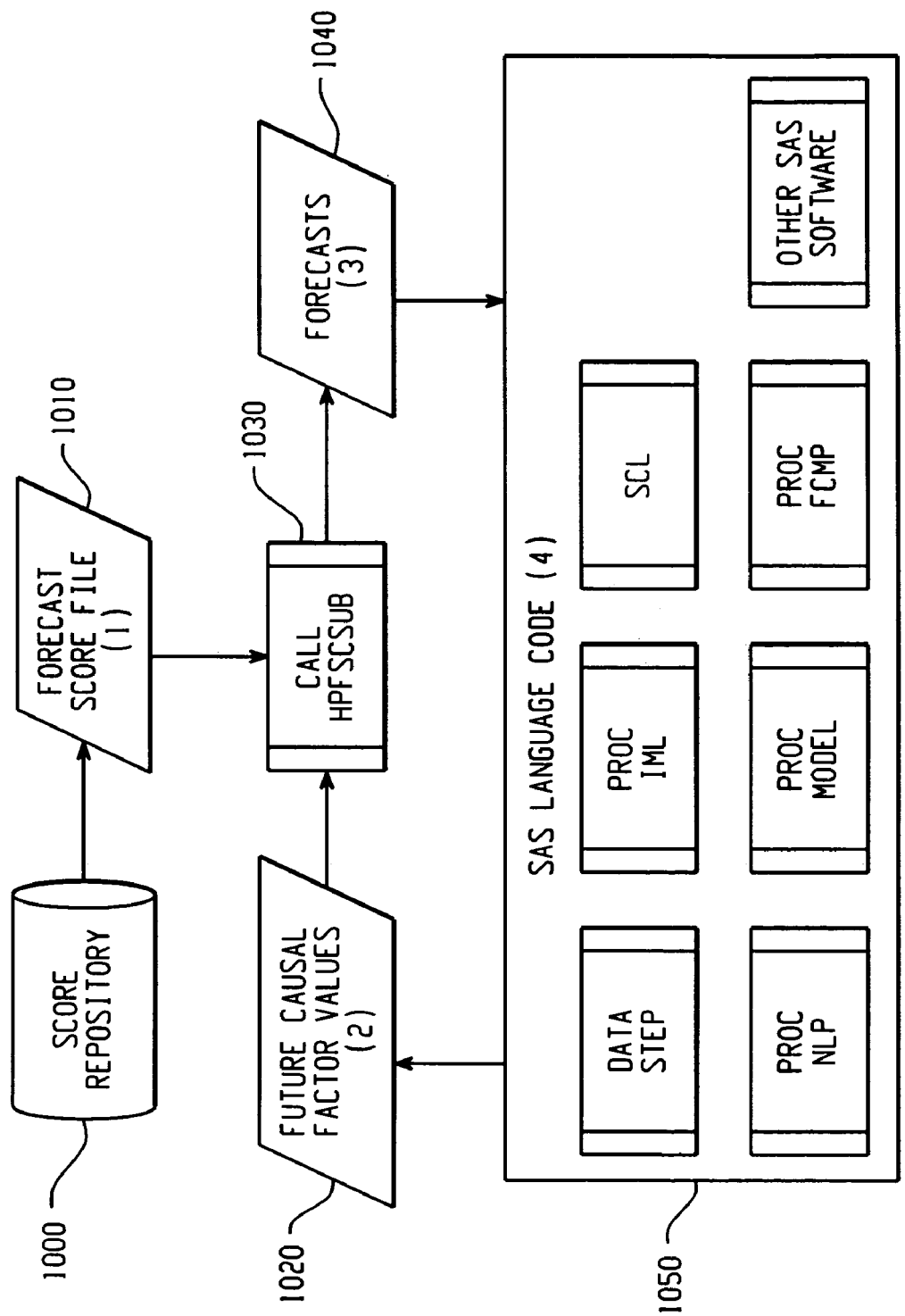
FIG. 16 is a block diagram depicting use of software routines in a decision process.

The HPFSCSUB routine can be used in a decision process in a variety of ways, such as the manner depicted in FIG. 16. For each time series to score, the forecast scoring process works as follows:

1. The forecast score file 1010 is read by the HPFSCSUB routine 1030 from the score repository (storage) 1000.
2. The future values 1020 of the controllable causal factors are provided by the SAS language code.
3. Using the forecast score file 1010 and the future values 1020, the HPFSCSUB routine 1030 generates forecast results 1040.
4. Steps 2 and 3 are repeated as needed by the decision-making process implemented in the SAS language code 1050. As an example of code 1050, PROC MODEL can be used to estimate the general non-linear time series model. PROC NLP or PROC IML (i.e., optimization routines) can be used to optimize profits based on the future pricing decisions.

FIGS. 17–19 provide an example of operation of the HPFSCSUB routine. This example uses a score file to compute a forecast. The PROC HPFARIMASPEC code at 1100 is used to create an ARIMA model specification file. The PROC HPFSELECT code at 1110 controls the forecasting model selection process by defining lists of candidate forecasting models. Using model selection lists created by HPFSELECT, you can control which forecasting model or models HPF uses to forecast particular time series. The HPFSELECT procedure creates model selection files and stores them in a repository for later use by the HPFENGINE procedure which code is at 1120.

In this example, the score file is stored in the scor0 entry within the catalog work.score. Note that even though the model includes three inputs, only one is designated controllable in the call to PROC HPFENGINE. Therefore, only future values of the variable controlinput are required to generate forecasts using the score file. In the call to PROC HPFENGINE, the controllable input was extended with the mean of the controlinput series. Therefore the mean is used as input to the forecast score function so that a valid comparison can be made between the forecast results from PROC HPFENGINE and HPFSCSUB. These procedures are also discussed in the Forecasting Provisional Application. The output of the forecasting is shown in FIG. 19 at 1200.

It should be understood that similar to the other processing flows described herein, the steps and the order of the steps in the flowchart described herein may be altered, modified, deleted and/or augmented and still achieve the desired outcome.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods described herein can store the models in files in a variety of different formats. As an illustration, the systems and methods described herein may be implemented on various types of computer architectures, such as for example on a single general purpose computer or workstation, or on a networked system, or in a client-server configuration, or in an application service provider configuration.

It is noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-implemented system for performing forecast scoring based upon time series data that is indicative of a data generation activity occurring over a period of time, comprising:
one or more data stores to store historical data and future data;
wherein the historical data includes historical exogenous inputs;
wherein the future data includes future exogenous inputs;
a dynamic statistical model to receive the historical data and future data that are stored in the one or more data stores;
wherein the dynamic statistical model is to provide forecast scoring based upon the historical exogenous inputs and the future exogenous inputs; and
an optimizer having an objective function;
said optimizer iteratively varying the future data, wherein forecasts associated with the varying future data values are generated by the dynamic statistical model for evaluation by the objective function:
wherein the generated forecasts are provided to an external system or user.

2. The system of claim 1, wherein the dynamic statistical model is contained within a forecast scoring engine.

3. The system of claim 1, wherein the dynamic statistical model is an autoregressive integrated moving average (ARIMA) model or an unobserved component model (UCM).

4. The system of claim 1, wherein the future data includes future causal factor values.

5. The system of claim 1, wherein the one or more data stores include stores selected from the group consisting of data structures, RAM, ROM, computer hard drives, and combinations thereof.

6. The system of claim 1, wherein the historical data includes number of observations, time series data, and seasonality.

7. The system of claim 1, wherein the future data includes forecast horizon and decision variables.

8. The system of claim 1, wherein the generated forecast scores are for use in optimization or goal-seeking.

9. The system of claim 1, further comprising:
model selection software instructions to select one or more time series model to model the time series data.

10. The system of claim 9, further comprising:
forecast function generation software instructions to generate a forecast function based upon a selected time series model, the historical data and estimated parameters;
whereby the forecast function is for use in providing the forecast scoring.

11. The system of claim 10, wherein the system further comprises one or more computer storage mediums for storing the forecast function generation software instructions.

12. The system of claim 11, wherein the one or more computer storage mediums include mediums selected from RAM, ROM, CD-ROM, computer hard drives, and combinations thereof.

13. The system of claim 10, wherein the forecast function generation software instructions are instructions selected from the group consisting of machine code, source code, and combinations thereof.

14. The system of claim 1, wherein the forecast scoring specifies how to forecast a time series given a fitted model through iteratively varying future input values.

15. The system of claim 14, wherein the forecast scoring is for use in analyzing a dynamic price optimization situation;
wherein the demand series data of the historical data includes demand series in units data;
wherein the historical data includes price series per unit demand data;
wherein the future data includes future prices data;
wherein the dynamic statistical model is to provide forecast scoring based upon the historical data and the future data.

16. The system of claim 15, wherein the future prices data is representative of decision variables and one or more pricing policies.

17. The system of claim 1, wherein said optimizer iterates over a thousand iterations in varying the future data values.

18. A data signal that is transmitted using a network, wherein the data signal includes the future data of claim 1, wherein the data signal comprises packetized data that is transmitted through a carrier wave across the network.

19. A computer-implemented method for performing forecast scoring based upon time series data that is indicative of a data generation activity occurring over a period of time, comprising:
storing in one or more data stores historical data and future data;
wherein the historical data includes historical exogenous inputs;
wherein the future data includes future exogenous inputs;
using a dynamic statistical model to receive the historical data and future data that are stored in the one or more data stores;
wherein the dynamic statistical model is to provide forecast scoring based upon the historical exogenous inputs and the future exogenous inputs; and
using an optimizer having an objective function;
said optimizer iteratively varying the future data, wherein forecasts associated with the varying future data values are generated by the dynamic statistical model for evaluation by the objective function;
wherein the generated forecasts are provided to an external system or user.

20. Computer software stored on one or more computer readable mediums, the computer software comprising program code for carrying out a method for performing forecast scoring based upon time series data that is indicative of a data generation activity occurring over a period of time, said software comprising:
instructions for storing in one or more data stores historical data and future data;
wherein the historical data includes historical exogenous inputs;
wherein the future data includes future exogenous inputs;
instructions for using a dynamic statistical model to receive the historical data and future data that are stored in the one or more data stores;
wherein the dynamic statistical model is to provide forecast scoring based upon the historical exogenous inputs and the future exogenous inputs; and
instructions for using an optimizer having an objective function;
said optimizer iteratively varying the future data, wherein forecasts associated with the varying future data values are generated by the dynamic statistical model for evaluation by the objective function;
wherein the generated forecasts are provided to an external system or user.

* * * * *